(12) United States Patent
Lee

(10) Patent No.: US 12,338,793 B2
(45) Date of Patent: Jun. 24, 2025

(54) WIND POWER GENERATION SYSTEM USING MOVING BODY

(71) Applicant: Cafe24 Corp., Seoul (KR)

(72) Inventor: Jae Suk Lee, Seoul (KR)

(73) Assignee: Cafe24 Corp., Seoul (KR)

( * ) Notice: Subject to any disclaimer, the term of this patent is extended or adjusted under 35 U.S.C. 154(b) by 0 days.

(21) Appl. No.: 18/288,562

(22) PCT Filed: Apr. 27, 2022

(86) PCT No.: PCT/KR2022/005989
§ 371 (c)(1),
(2) Date: Oct. 26, 2023

(87) PCT Pub. No.: WO2022/231289
PCT Pub. Date: Nov. 3, 2022

(65) Prior Publication Data
US 2024/0200531 A1 Jun. 20, 2024

(30) Foreign Application Priority Data

Apr. 27, 2021 (KR) .................. 10-2021-0054133
Apr. 27, 2021 (KR) .................. 10-2021-0054135

(51) Int. Cl.
*F03D 5/00* (2006.01)
*F03D 5/04* (2006.01)
*F03D 9/25* (2016.01)

(52) U.S. Cl.
CPC ................ *F03D 5/04* (2013.01); *F03D 9/25* (2016.05)

(58) Field of Classification Search
CPC ............... F03D 5/04; F03D 9/25; F03D 80/80
See application file for complete search history.

(56) References Cited

U.S. PATENT DOCUMENTS

| | | | |
|---|---|---|---|
| 4,756,666 A * | 7/1988 | Labrador | F03D 5/04 416/8 |
| 2008/0157526 A1* | 7/2008 | Davison | F03D 13/20 290/3 |
| 2012/0061972 A1 | 3/2012 | Young | |
| 2012/0274076 A1 | 11/2012 | Kelaiditis et al. | |
| 2016/0327027 A1* | 11/2016 | Ting | F03D 9/25 |

FOREIGN PATENT DOCUMENTS

| JP | 2006-183650 A | 7/2006 |
|---|---|---|
| KR | 10-2003-0035743 A | 5/2003 |
| KR | 10-2010-0094252 A | 8/2010 |
| KR | 10-2212665 B1 | 2/2021 |

* cited by examiner

*Primary Examiner* — Julio C. Gonzalez
(74) *Attorney, Agent, or Firm* — INVENSTONE PATENT, LLC

(57) ABSTRACT

A wind power generation system and a moving body are disclosed. The wind power generation system comprises: a rail part for providing a horizontal movement path; and a plurality of moving bodies for moving along the movement path of the rail part. The moving body may comprise: a blade for providing power for the movement of the moving body on the basis of energy generated by the wind; a plurality of wheels, which engage with the rail part and rotate on the basis of the power provided by means of the blade, so as to move the moving body along the movement path of the rail part; and a nacelle having a power generator for producing electricity on the basis of the rotational force of the wheels.

18 Claims, 29 Drawing Sheets

WIND POWER GENERATION SYSTEM USING MOVING BODY

CROSS-REFERENCE TO RELATED APPLICATIONS

This application is a National Stage filing under 35 U.S.C. 371 of International Application No. PCT/KR2022/005989, filed on Apr. 27, 2022, which claims the benefit of earlier filing date and right of priority to Korean Application No. 10-2021-0054133 filed on Apr. 27, 2021, and Korean Application No. 10-2021-0054135 filed on Apr. 27, 2021 in the Korean Intellectual Property Office, the contents of which are all hereby incorporated by reference herein in their entirety.

BACKGROUND

Field

The present invention relates to a power generation system, and more particularly, to a wind power generation system that performs wind power generation based on one or a plurality of moving bodies having blades and a moving body included therein.

Related Art

A wind power generator is a device that converts wind energy into electrical energy. Wind causes the blades of the wind power generator to rotate. Electricity may be generated from the rotary force of the blades produced when the wind rotates the blades. Specifically, the wind power generator may be configured of three parts: blades, a transmission device, and a power generator. A blade is a device that is rotated by the wind and converts wind energy into mechanical energy. A power generator is a device that converts mechanical energy generated by the blades into electrical energy.

Such wind power generation is attracting attention as a new renewable energy to replace conventional fossil fuels. However, in the case of a rotor blade type wind power generator of a conventional configuration, it is necessary to enlarge a rotor blade to obtain greater electrical energy, whereas the enlargement of the rotor blade causes ambient noise.

SUMMARY

An aspect of the present invention is directed to providing a wind power generation system capable of addressing an issue associated with noise generation caused by the rotation of a conventional large rotor blade by generating electricity based on a moving body that uses wind power along the movement path provided by a rail part and the moving body used therein.

However, the aspect of the present invention is not limited to the aspect described above and may be diversely expanded without departing from the spirit and scope of the present invention.

An aspect of the present invention provides a wind power generation system. The wind power generation system includes: a rail part for providing a horizontal movement path; and a plurality of moving bodies for moving along the movement path of the rail part.

The moving body may include: a blade for providing power for moving the moving body based on energy generated by the wind; a plurality of wheels, which engage with the rail part and rotate based on the power provided by the blade, so as to move the moving body along the movement path of the rail part; and a nacelle having a power generator for producing electricity based on rotational force of the wheels. The rail part may have a railway shape in which two rails are paired in parallel, and the wheel may include an engagement groove into which the rail is inserted.

The power generator may be connected to a rotary shaft of the wheel and produce electricity based on the rotational force transmitted from the rotary shaft of the wheel. The power generator, the rotary shaft, the wheel, the rail part, and a transmission line for transmitting electricity to an outside are electrically connected so that electricity produced from the power generator may be transmitted to the transmission line through the rotary shaft, the wheel, and the rail part.

The rail part may form a loop, and each of a plurality of blades provided on the plurality of moving bodies may be configured to adaptively rotate to maximize power in a target movement direction based on information on a wind direction and information on the target movement direction determined according to a position of each of the plurality of blades in the loop. The rotation of each of the plurality of blades may be performed based on a rotary shaft perpendicular to the ground.

Each of the plurality of blades may be configured to rotate in a direction that allows leeward sailing, in response to a determination that the target movement direction coincides with a wind direction, and each of the plurality of blades may be configured to rotate in a direction to perform windward sailing, in response to a determination that the target movement direction is opposite to the wind direction.

Each of the plurality of blades may have a first partial blade and a second partial blade divided in a height direction. The first partial blade and the second partial blade may be configured to be rotatable independently of each other, and the first partial blade and the second partial blade may be configured to adaptively rotate to maximize power in each of the target movement direction based on information on a wind direction at each arranged height.

The rail part may form a loop, and each of the plurality of blades provided on the plurality of moving bodies may be configured of a flexible material and have a plurality of air pockets, and may be configured to be deformed into a shape that maximizes power in a target movement direction by controlling an air filling amount for at least one air pocket among the plurality of air pockets based on information on a wind direction and information on the target movement direction determined according to a position of each of the plurality of blades in the loop.

The rail part may form a loop, and the information on a position of each of the plurality of blades in the loop may be acquired by receiving a position identification signal from at least one of a position identification signal generation device provided in a plural number in the loop by a position signal reception device provided in each of the plurality of blades. The information on a wind direction may be acquired from a wind direction sensor provided in each of the plurality of blades.

The rail part is provided in a plural number, wherein the plurality of rail parts includes: a first rail part forming a first loop; and a second rail part forming a second loop disposed inside the first loop.

The blade may have a horizontal length of 90 m and a vertical height of 120 m. Each of the plurality of blades may be configured to adaptively rotate so that a moving speed of each of the moving bodies approaches 1.9 m/s. The wind power generation system may further include a connection part connecting the moving bodies, and the connection part may be configured to variably adjust an interval between the moving bodies.

Another aspect of the present invention provides the moving body. The moving body is used in the wind power generation system, and is configured to move along the movement path of the rail part for providing a horizontal movement path. The moving body includes: at least one blade for providing power for moving the moving body based on energy generated by the wind; a plurality of wheels, which engage with the rail part and rotate based on the power provided by the blade, so as to move the moving body along the movement path of the rail part; and a nacelle having a power generator for producing electricity based on rotational force of the wheels.

The rail part may have a railway shape in which two rails are paired in parallel, and the wheel may include an engagement groove into which the rail is inserted. The power generator may be connected to a rotary shaft of the wheel and produce electricity based on rotational force transmitted from the rotary shaft of the wheel. The power generator, the rotary shaft, the wheel, the rail part, and a transmission line for transmitting electricity to the outside are electrically connected so that electricity produced from the power generator may be transmitted to the transmission line through the rotary shaft, the wheel, and the rail part.

The blade may be configured to adaptively rotate to maximize power in a target movement direction based on information on a wind direction and information on the target movement direction determined according to a position of the moving body in the loop formed by the rail part.

The blade may be configured of a flexible material and has a plurality of air pockets, and may be configured to be deformed into a shape that maximizes power in a target movement direction by controlling an air filling amount for at least one air pocket among the plurality of air pockets based on information on a wind direction and information on the target movement direction determined according to a position of the moving body in the loop formed by the rail part.

The blades are plural, and each of the plurality of blades may have a first partial blade and a second partial blade divided in a height direction, the first partial blade and the second partial blade may be configured to be rotatable independently of each other, and the first partial blade and the second partial blade may be configured to adaptively rotate to maximize power in each of the target movement direction based on information on a wind direction at each arranged height.

The blade may have a horizontal length of 90 m and a vertical height of 120 m. The blade may be configured to adaptively rotate so that a moving speed of the moving body approaches 1.9 m/s.

The disclosed technology can have the following effects. However, it does not mean that a specific exemplary embodiment should include the entire following effects or should include only the following effects, and it should not be understood that the scope of the right of the disclosed technology is limited thereto.

According to a wind power generation system according to an embodiment of the present invention, there is provided a wind power generation system capable of addressing an issue associated with noise generation caused by the rotation of a conventional large rotor blade by generating electricity based on a moving body that uses wind power along the movement path provided by a rail part and the moving body used therein.

The wind power generation system is configured to rotate a rotary shaft of a power generator using the movement of a plurality of blades and/or a moving body that move(s) along the movement path provided by a rail, thereby addressing an issue associated with noise generation caused by the rotation of a conventional large rotor blade.

In addition, in configuring a wind farm capable of producing a large amount of electricity, space efficiency can be increased compared to a conventional rotor blade type wind power generator, and construction costs can also be reduced.

In addition, by configuring the blade to be rotatable adaptively according to a wind direction, it is possible to produce electricity with high efficiency regardless of changes in weather conditions.

DESCRIPTION OF EXEMPLARY EMBODIMENTS

Figure 1:
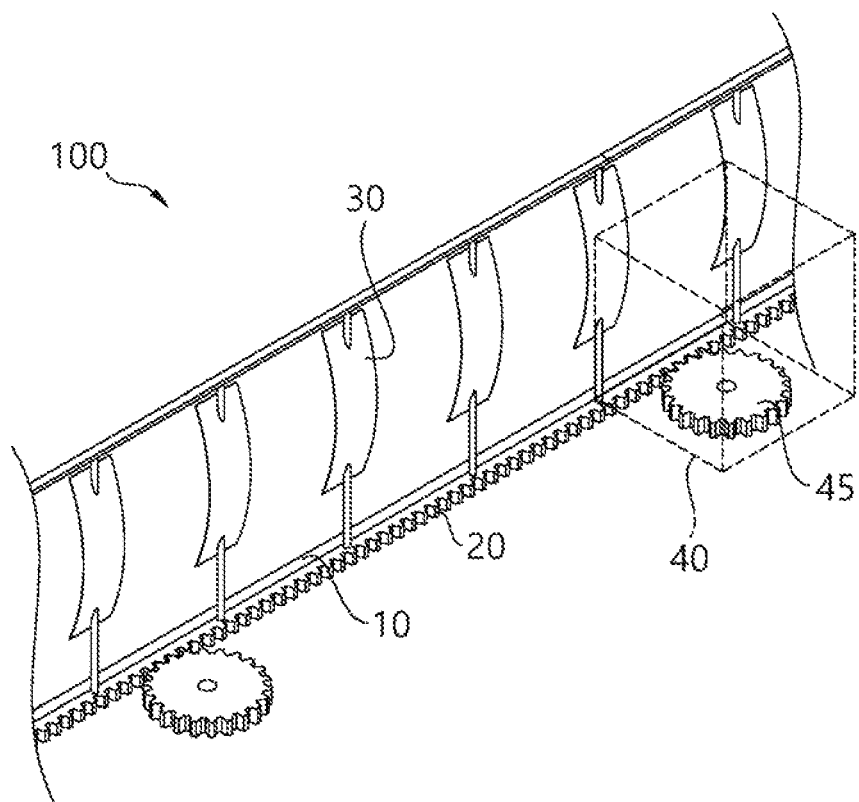
FIG. 1 is a conceptual view of a wind power generation system according to an embodiment of the present invention.

The present invention may be variously modified and have various types, and specific embodiments thereof will be illustrated in the drawings and described in detail in the detailed description.

However, this is not intended to limit the present invention to specific embodiments, and it should be understood that all modifications, equivalents, and substitutes included in the spirit and technical scope of the present invention are included.

Terms such as "first" and "second" may be used to describe various components, but the components are not restricted by the terms. The terms are used only to distinguish one component from another component. For example, a first component may be named a second component without departing from the scope of the right of the present invention. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. It will be understood that when a component is referred to as being "directly connected or coupled", no intervening components are present between the two components.

The terms used in the present specification are merely used to describe specific embodiments and are not intended to limit the present invention. A singular expression includes a plural expression, unless the context clearly states otherwise. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless otherwise defined, all terms including technical and scientific terms used herein have the same meaning as commonly understood by those skilled in the technical field to which the present invention pertains. It will be understood that terms, such as those defined in commonly used dictionaries, should be interpreted as having meanings that are consistent with their meanings in the context of the relevant art and will not be interpreted in an idealized or overly formal sense unless expressly so defined herein.

Hereinafter, preferred embodiments of the present invention will be described in detail with reference to the accompanying drawings. In describing the present invention, in order to facilitate the overall understanding, the same reference numerals are used to designate the same components throughout the drawings, and repeated descriptions of the same components will be omitted.

As described above, such wind power generation is attracting attention as a new renewable energy to replace conventional fossil fuels. However, in the case of a rotor blade type wind power generator of a conventional configuration, it is necessary to enlarge a rotor blade to obtain greater electrical energy, whereas the enlargement of the rotor blade causes ambient noise. In order to minimize the damage caused by rotational noise, attempts have been made to change the installation position of a wind power generator to the sea. However, in the case of offshore installation, there is an issue that the economic feasibility, which is an advantage of wind power generation, is rather deteriorated due to an increase in the construction cost, and it may also become an environmental issue.

The present invention is directed to addressing an issue as above. The wind power generation system according to an embodiment of the present invention is configured to rotate a rotary shaft of a power generator using the movement of a plurality of blades and/or a moving body that move(s) along the movement path provided by a rail, thereby addressing an issue associated with noise generation caused by the rotation of a conventional large rotor blade. Hereinafter, the wind power generation system according to an embodiment of the present invention will be described in more detail with reference to the drawings.

First Embodiment

Figure 2:
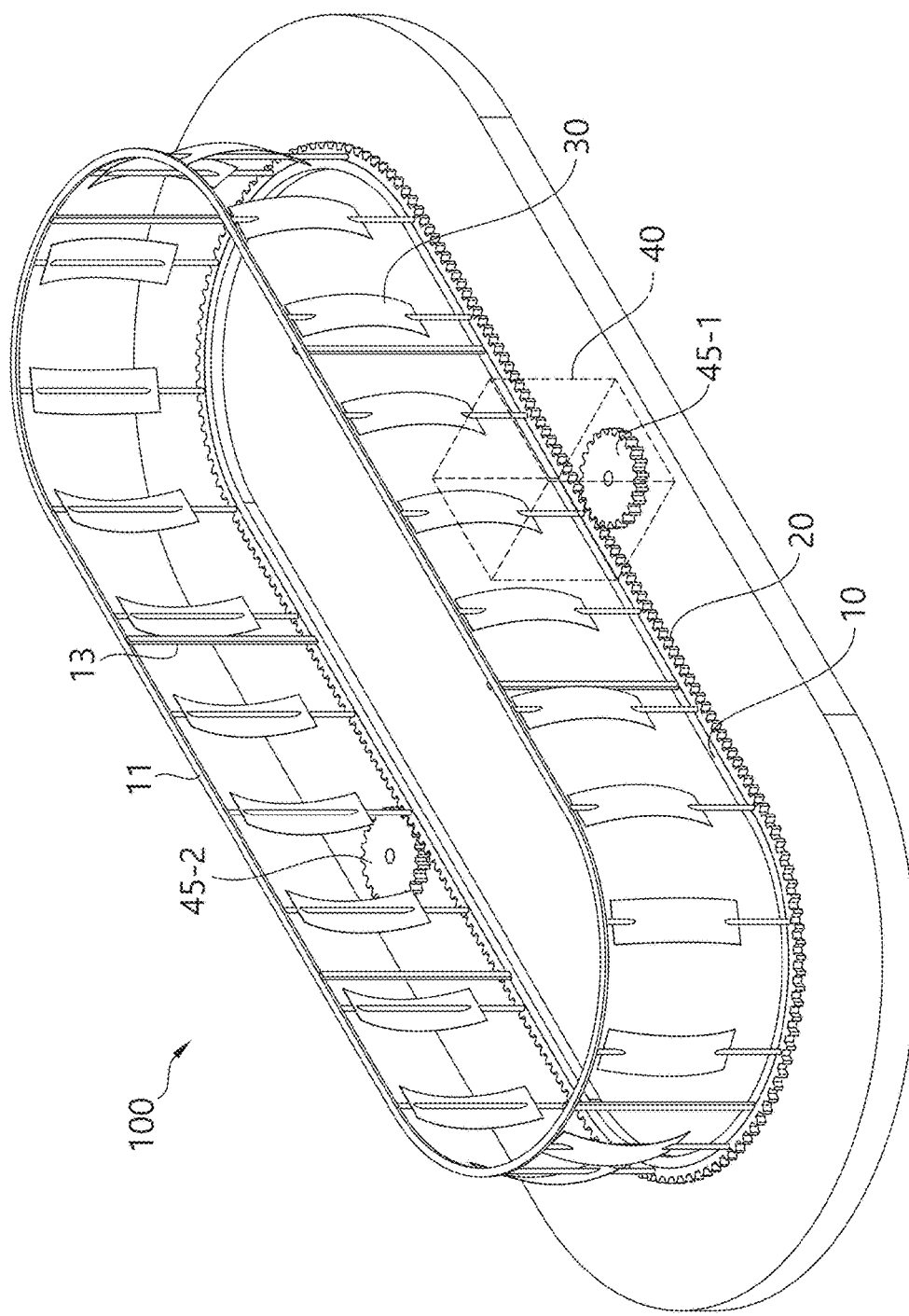
FIG. 2 is a perspective view of a loop-type wind power generation system according to an embodiment of the present invention.

FIG. 1 is a conceptual view of a wind power generation system according to an embodiment of the present invention. FIG. 2 is a perspective view of a loop-type wind power generation system according to an embodiment of the present invention. As illustrated in FIG. 1 or 2, a wind power generation system 100 according to an embodiment of the present invention may include a rail 10, a moving body 20, a plurality of blades 30, and a nacelle 40 having a power generator.

The rail 10 may provide a movement path through which the moving body 20 and/or the plurality of blades 30 slide and move. In the embodiment illustrated through FIG. 1, the rail 10 is exemplified as providing a movement path from the side surface of the moving body 20, but the rail 10 may have various design forms that may provide a movement path through which the moving body 20 and/or the plurality of blades 30 may slide and move. For example, a form such as a train rail or a mono rail may be employed. As illustrated in FIG. 1, the rail 10 according to an embodiment of the present invention may be installed on the ground or installed through a support to provide a movement path in a horizontal direction of the moving body 20 and/or the plurality of blades 30.

The moving body 20 may be configured to slide and move along the movement path provided by the rail 10, and the plurality of blades 30 may be installed on the moving body to provide power for movement of the moving body 20 based on energy from wind. In other words, when the wind blows, the energy provided by the wind acts on the blades 30, and the blades 30 and the moving body 20 to which the blades are connected are configured to move. In the embodiment illustrated in FIG. 1, it is exemplified that the moving body 20 contacts the rail 10 and the plurality of blades 30 are installed on the moving body 20, but the installation form and structure of the rail 10, the moving body 20, and the blades 30 may be employed in various modifications. For example, in an aspect, each of the blades 30 may be configured to be slidably movable on the rail 10, and the moving body 20 may also function as a configuration connecting the plurality of blades 30. In an aspect, the moving body 20 may also be integrally formed as illustrated in FIG. 1, and in another aspect, the moving body 20 may be in the form of a chain having a plurality of segment structures. Further, according to the embodiment, the moving body 20 may be configured of a flexible material.

Referring back to FIG. 1, the nacelle 40 having a power generator may be arranged to be adjacent to the moving body 20 and/or the blades 30. According to an aspect, the power generator may be a power generator that generates electricity according to the rotation of a power generator central shaft gear 45 coupled to a power generator central rotary shaft, and the central rotary shaft of the power generator may be configured to rotate in conjunction with the movement of at least one of the moving body 20 and the blades 30. FIG. 1 illustrates a configuration in which the power generator central rotary shaft rotates in conjunction with the movement of the moving body 20.

Figure 3:
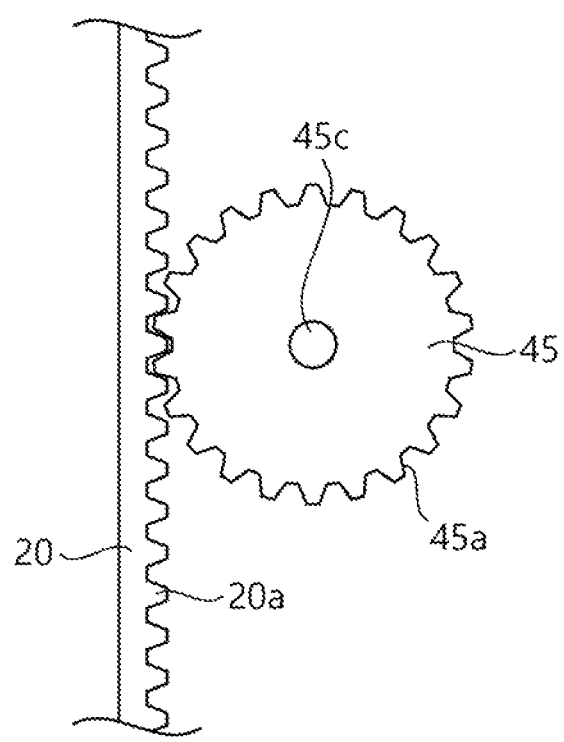
FIG. 3 illustrates a power transfer structure between a blade and/or a moving body and a power generator central shaft according to a first aspect.
Figure 4:
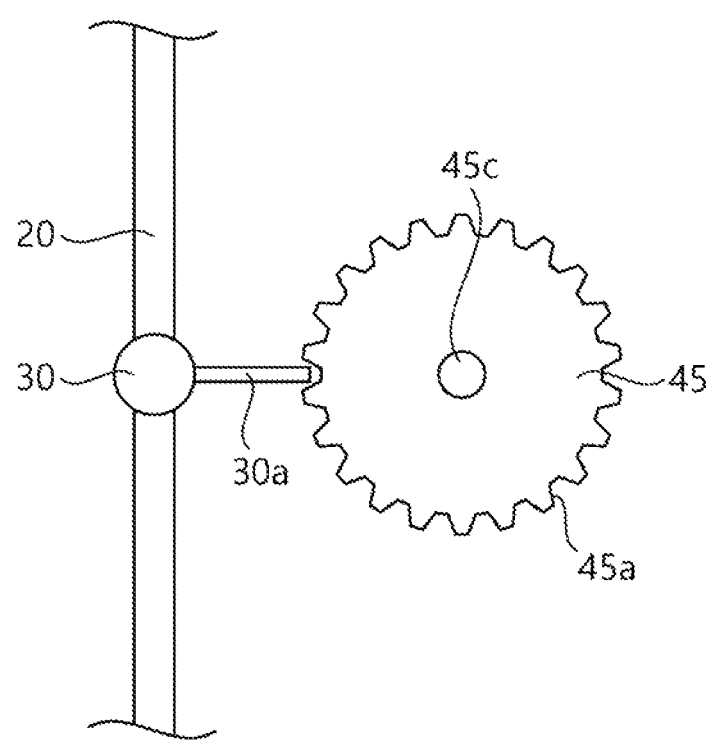
FIG. 4 illustrates a power transfer structure between a blade and/or a moving body and a power generator central shaft according to a second aspect.

In this regard, FIG. 3 illustrates a power transfer structure between a blade and/or a moving body and a power generator central rotary shaft according to a first aspect. FIG. 4 illustrates a power transfer structure between a blade and/or a moving body and a power generator central rotary shaft according to a second aspect.

As illustrated in FIG. 3, the power generator may have a power generator central rotary shaft 45c and a circular toothed gear 45 coupled to the power generator central rotary shaft 45c, a plurality of toothed threads 20a may be provided on a surface facing the power generator of at least one of the moving body 20 and the blades 30, and the power generator central rotary shaft 45c may be configured to rotate as the toothed threads 20a move in engagement with toothed threads 45a of the circular toothed gear 45 according to the movement of at least one of the moving body 20 and the blades 30. Although FIG. 3 exemplarily illustrates that the toothed threads 20a are provided on the moving body 20, the toothed threads 20a may also be provided on a surface facing the power generator of the blades 30.

Alternatively, as illustrated in FIG. 4, for example, a blade power transfer rod 30a may be provided on a side facing the power generator of the blades 30, and the power generator central rotary shaft 45c may be configured to rotate by acting on the gear toothed threads 45a formed in the power generator central shaft gear 45 while the blade power transfer rod 30a moves. Unlike that illustrated in FIG. 4, a power transfer rod may be provided at a predetermined interval on a side facing the power generator of the moving body 20 and may be configured to induce rotation of the central rotary shaft 45c.

Figure 12:
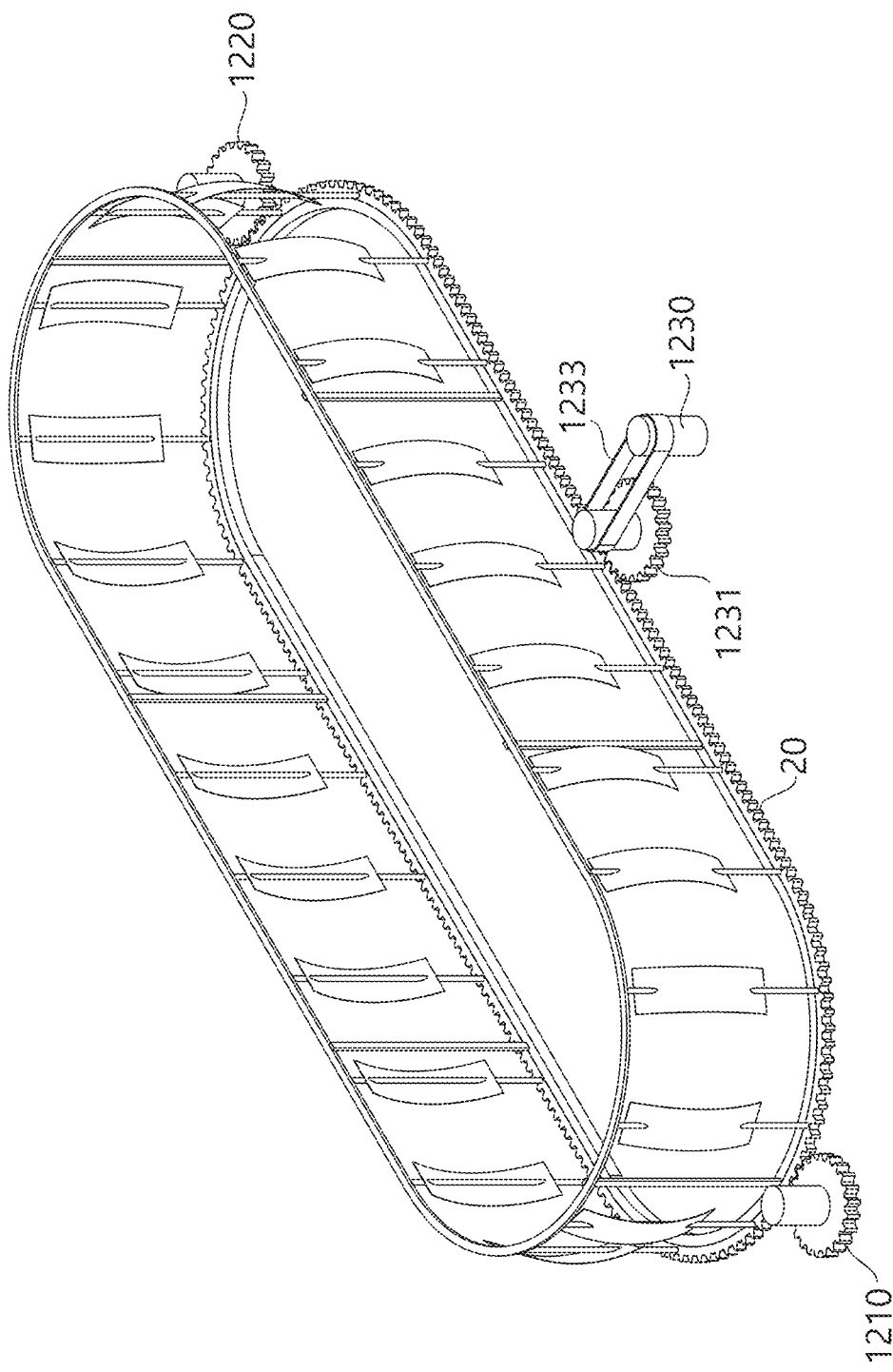
FIG. 12 is an exemplary view of the arrangement of a power generator central shaft.

FIG. 12 is an exemplary view of the arrangement of a power generator central rotary shaft. As illustrated in FIG. 12, the power generator central shaft may have various embodiments in relation to the rail. According to an aspect, in an embodiment in which the rail 10 and the moving body 20 form a loop as illustrated in FIG. 2 or FIG. 12, power generator central rotary shafts 1210 and 1220 may also be positioned outside the loop, and may also be positioned inside the loop. In addition, the power generator central rotary shafts 1210 and 1220 may also rotate directly in conjunction with the movement of the moving body and/or the blades, and may also be configured to rotate in conjunction with a medium unit such as a power generator central rotary shaft 1230. As illustrated in FIG. 12, the wind power generation system according to an embodiment of the present invention may further include a power transfer shaft 1231 that rotates in conjunction with the movement of at least one of the moving body 20 and the blades 30, and a rotation pulley provided on the power transfer shaft 1231 and a rotation pulley provided on the power generator central rotary shaft 1230 of the power generator may also be configured to rotate in conjunction with a rotating belt 1233. The rotating belt 1233 may also be configured, for example, in the form of a conveyor belt or chain.

Referring back to FIG. 2, in the wind power generation system according to an embodiment of the present invention, the rail 10 may be configured to form a loop. According to an aspect, the rail 10 may further include an upper frame 11 supported by a plurality of upper frame supports 13, wherein the upper frame 11 may be configured to maintain an upper portion of the blade 30 movably to improve the standing stability of the blades 30.

Since the rail 10 is formed as a loop, the movement path of the plurality of blades and/or the moving body may have a circulating structure. Herein, each of the plurality of blades 30 may be configured to adaptively rotate to maximize power in a target movement direction based on information on a wind direction and information on the target movement direction determined according to a position of each of the plurality of blades 30 in the loop.

According to another aspect, each of the plurality of blades 30 may be configured of a flexible material and have a plurality of air pockets, and may also be configured to be deformed into a shape that maximizes power in a target movement direction by controlling an air filling amount for at least one air pocket among the plurality of air pockets based on information on a wind direction and information on the target movement direction determined according to a position of each of the plurality of blades in the loop.

Figure 10:
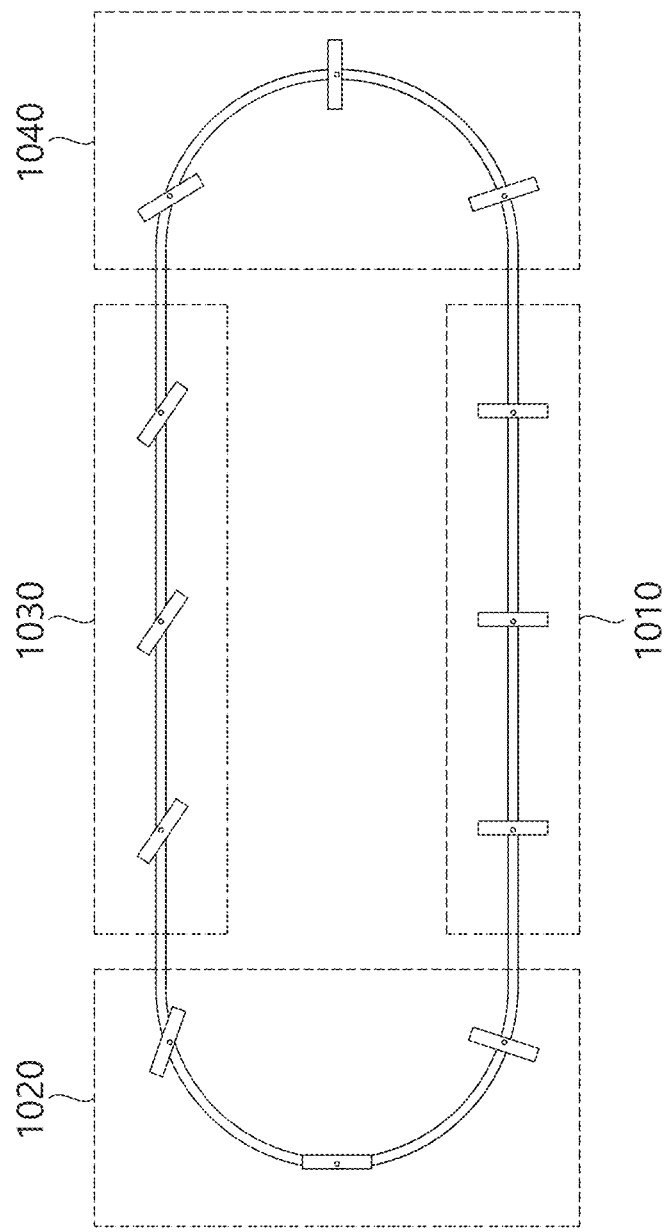
FIG. 10 is a top view of a wind power generation system according to an aspect.

The target movement direction will be described in more detail with reference to FIG. 10. FIG. 10 is a top view of a wind power generation system according to an aspect. As illustrated in FIG. 10, according to an embodiment of the present invention, the loop formed by the rail 10 may include, for example: a first portion 1010 for providing a movement path in a first direction; a second portion 1030 for providing a movement path in a second direction opposite to the first direction; a first joint portion 1020 for providing a movement path from the first portion to the second portion; and a second joint portion 1040 for providing a movement path from the second portion to the first portion. For example, the blades may be configured to move clockwise within the loop. Accordingly, the target movement direction of the blades in the first portion 1010 may be a (right→left)

direction in FIG. 10, and the target movement direction of the blades in the first joint portion 1020 is gradually changed from a (right→left) direction to a (downward→upward) direction, and again in a (left→right) direction, depending on the extent to which the blade has moved from the first portion 1010 to the second portion 1030. The target movement direction of the blades in the second portion 1030 is determined in a (left→right) direction, and the target movement direction of the blades in the second joint portion 1040 is gradually changed from a (left→right) direction to a (upward→downward) direction, and again in a (right→left) direction, depending on the extent to which the blade has moved from the second portion 1030 to the first portion 1010. In other words, the target movement direction of the blades may be determined differently according to a position of each blade in the loop.

When the target movement direction of each blade is determined, based on the information on a wind direction, each blade may be configured to adaptively rotate so that the orientation of each blade is changed to maximize the power in the target movement direction of each blade. For example, rotation of each of the plurality of blades may be performed based on a rotary shaft perpendicular to the ground.

Figure 5:
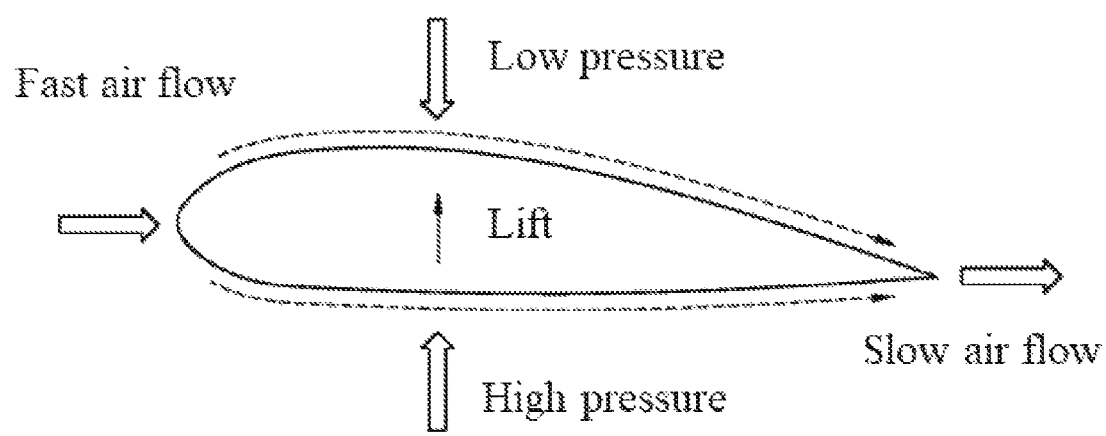
FIG. 5 is a conceptual view of Bernoulli's theorem.
Figure 6:
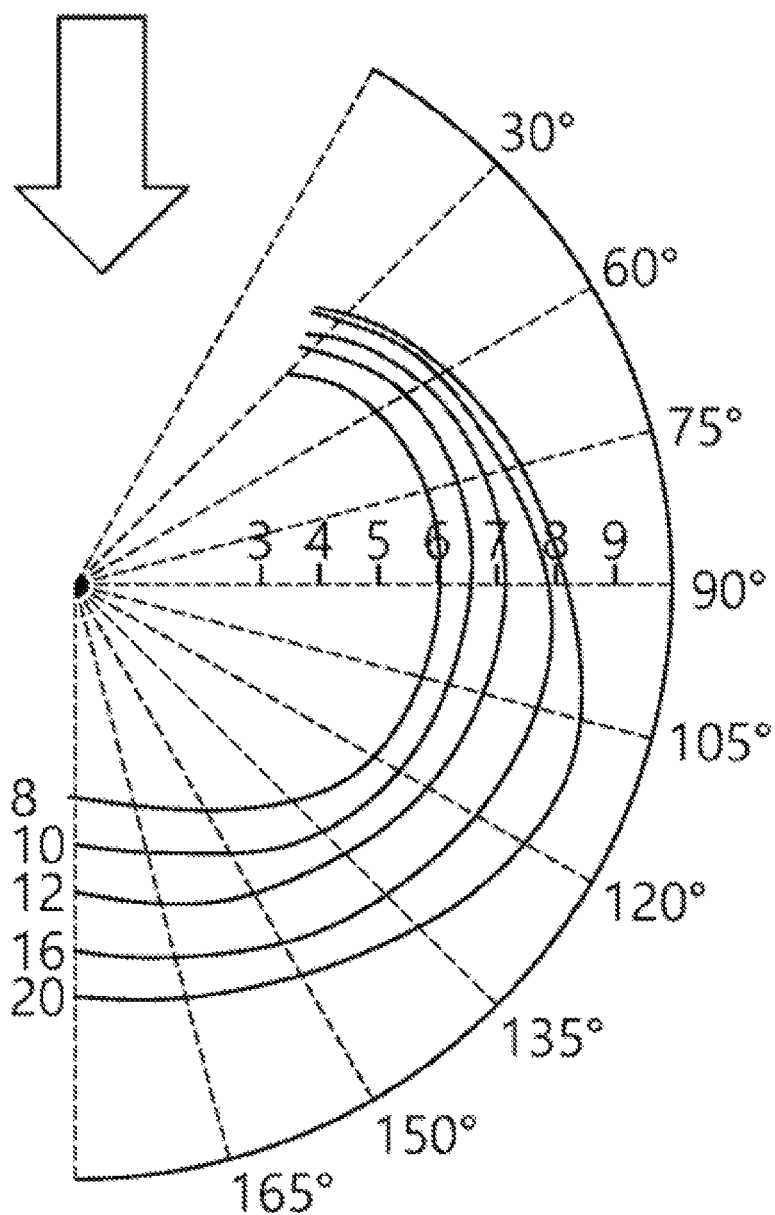
FIG. 6 illustrates a speed of a sailing yacht according to the wind and sailing form.

In relation to maximizing power in the target movement direction according to a wind direction, FIG. 5 is a conceptual view of Bernoulli's theorem, and FIG. 6 illustrates a speed of a sailing yacht according to the wind and sailing form. As illustrated in FIG. 5, Bernoulli's theorem may explain the phenomenon in which lift is generated by generating a pressure difference by changing the speed with respect to the flow of air, and by applying Bernoulli's theorem, the blades may be configured to be oriented so as to maximize power in the desired target movement direction, depending on a wind direction. In addition, FIG. 6 illustrates a speed of a sailing yacht according to the wind and sailing form. As illustrated in FIG. 6, the sailing yacht may generate power so that the yacht is headed in a desired direction even in the same wind direction by appropriately adjusting the direction of the sail. By a similar principle, when the target movement direction is determined according to a position of the blade also in the wind power generation system according to an embodiment of the present invention, the blades are rotated so that the power in the target movement direction may be maximized in consideration of a wind direction, and then the orientation of the blade may be changed.

For example, each of the plurality of blades may be configured to rotate in a direction to perform leeward sailing, in response to a determination that the target movement direction coincides with a wind direction, and each of the plurality of blades may be configured to rotate in a direction to perform windward sailing, in response to a determination that the target movement direction is opposite to the wind direction. In FIG. 10, when the wind direction is a (right→left) direction, the blade may be rotated in the direction to perform the leeward sailing in the first portion 1010, and the blade may be rotated in the direction to perform the windward sailing in the second portion 1030. In the first joint portion 1020 and the second joint portion 1030, the blade may be rotated to maximize power according to the target movement direction according to the positions of the respective blades.

According to an aspect of the present invention, each blade may be configured in a form such as a sail of a sailing yacht. Each blade may be provided with a support, and a thin film in the form of a sail may be configured to be held by the support. Accordingly, it is possible to configure the wind power generation system according to an aspect of the present invention at a significantly reduced facility cost compared to a conventional wind power generator having a large rotor blade. The thin film in the form of a sail may be formed of a tent material such as hemp cloth or cotton cloth, or a synthetic fiber such as tetron, or a polymer fusion material may also be used.

As described above, with respect to the principle of Bernoulli's theorem and/or the adjustment principle of the heading direction of a sailing yacht, it is possible to deform each of the blades 30 to have a shape that maximizes power in a target movement direction. For example, according to Bernoulli's theorem, by varying the airflow velocity on either side of the blade by increasing the gradient on one side of the blade and making it larger relative to the gradient on the other side, it may be configured to generate power from one specific side of the blade to the opposite side.

In an exemplary embodiment, each of the plurality of blades may be made of a flexible material and have a plurality of air pockets, and may be configured to selectively change an air filling amount in a specific air pocket among the plurality of air pockets. Accordingly, it is possible to implement a shape in which the blade has power in a desired direction under a predetermined wind condition. An air pump may be used, for example, to change the air filling amount.

In another embodiment, a blade in the form of a thin film that does not have a separate air pocket may be controlled by a support in the form of a grid that may change an angle in units of segments, and it may also be configured to deform the blade into a shape that maximizes power in a desired movement direction under a given wind condition by changing an amount of rotation in units of each grid cell.

Figure 7:
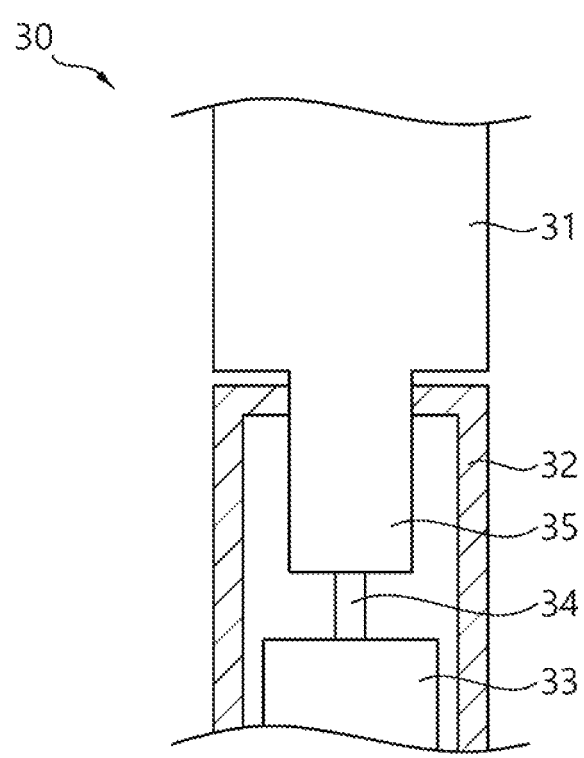
FIG. 7 is a cross-sectional view of a blade support according to an aspect.

According to an aspect of the present invention, the rotation of each blade may be, for example, performed based on a rotary shaft perpendicular to the ground. FIG. 7 is a cross-sectional view of a blade support according to an aspect. As illustrated in FIG. 7, the support of each blade may include an upper support 31 configured to support a thin film in the form of a sail and a lower support 32 to which the upper support 31 is rotatably coupled. The lower support 32 provides a cavity through which a blade rotary shaft 35 coupled to the upper support 31 may pass. The blade rotary shaft 35 may be connected to a motor shaft 34 to rotate the upper support by rotation based on the rotary force from a motor 33, and may adjust the orientation of a thin film in the form of a sail in a desired direction.

Figure 8:
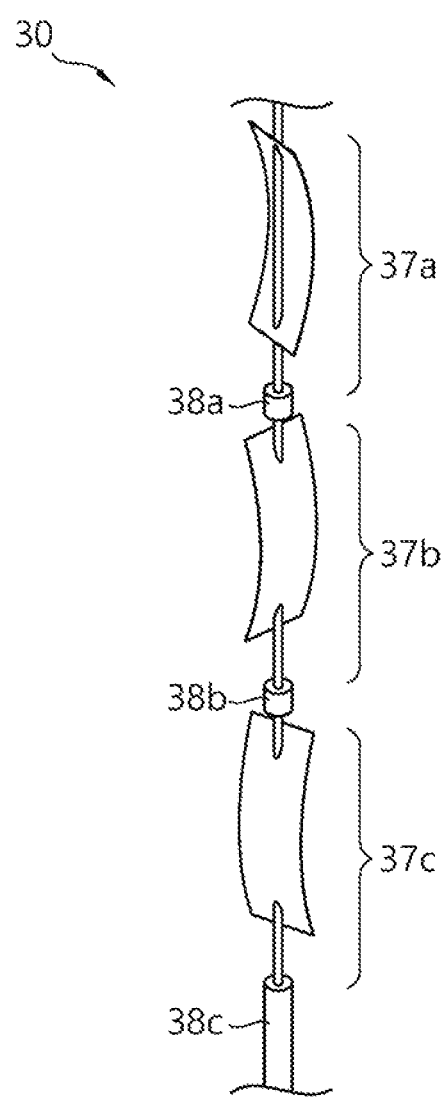
FIG. 8 is an exemplary view of a highly detachable blade according to an aspect.

FIG. 8 is an exemplary view of a highly detachable blade according to an aspect. In the wind power generation system according to an aspect of the present invention, an appropriate blade size for maximizing electricity generation efficiency may be a fairly large scale, and a wind direction may be different depending on the altitude. Accordingly, in order to maximize power in a target movement direction of the blade 30, even when a wind direction is different depending on the altitude, the blade has a first portion 37a, a second portion 37b, and a third portion 37c divided according to the attitude, and has a first joint 38a, a second joint 38b, and a third joint 38c. By configuring each joint portion to be rotatable, respectively, it is possible to set the orientation of a thin film in the form of a sail included in each portion differently. In other words, each of the plurality of blades 30 may have a first partial blade and a second partial blade divided in a height direction, the first partial blade and the second partial blade may be configured to be rotatable independently of each other, and the first partial blade and the second partial blade may be rotated to maximize power in the target movement direction of the blade 30 based on information on a wind direction at each arranged height.

The acquisition of position information for determining the target movement direction of the blade and information on a wind direction may be achieved by employing any of the conventional sensor systems, and the control system for determining and changing the orientation of the blade may also select any of the conventional control systems.

For example, the information on a position of each of the plurality of blades in the loop may be acquired by receiving a position identification signal from at least one of a position identification signal generation device provided in a plural number in the loop by a position signal reception device provided in each of the plurality of blades. In another aspect, position information of each blade may be determined by a positioning system such as GPS. The target movement direction according to the position of the blade may be determined according to table information stored in the database, or a computing device may be configured to calculate in real time based on each position and the loop shape. The information on a wind direction may be acquired from a wind direction sensor provided in each of the plurality of blades, and accurate information on a wind direction for each blade may be used. The control system for performing a calculation such as orientation determination may be set to be provided with a separate computing device or processor for each blade, or by having an integrated control system configured to transmit and receive information to and from each blade, the integrated control system may be configured to control each blade.

Referring back to FIG. 2, the wind power generation system 100 according to an embodiment of the present invention may have a plurality of nacelles. For example, the nacelle 40 may have a power generator having a power generator central shaft gear 45-1, and may also further have a separate nacelle including an additional power generator having a power generator central shaft gear 45-2.

Depending on the form of a wind power generator, the power generator provided in the nacelle 40 may be configured to have a predetermined target rotation speed. Alternatively, it may be required to adjust the target rotation speed as needed.

Figure 9:
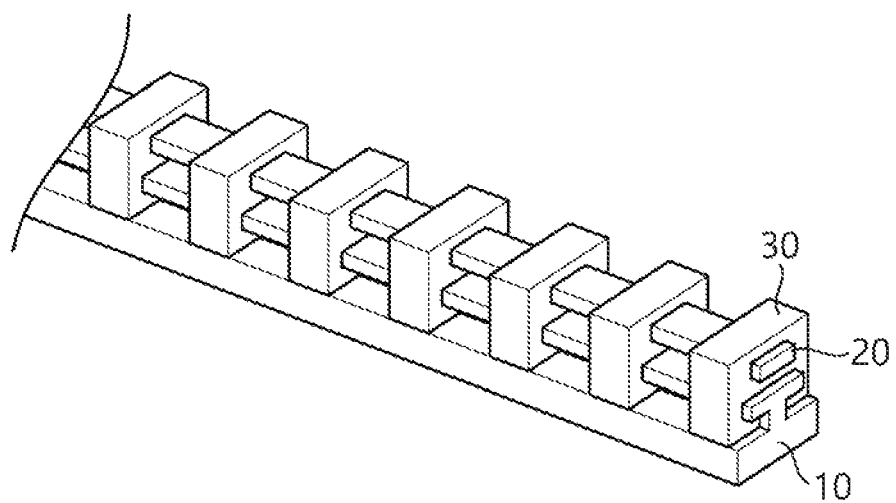
FIG. 9 is a view illustrating a coupling relationship between a rail, a moving body, and a blade according to an aspect.

In this regard, each of the plurality of blades 30 may be configured such that an installation position with respect to the moving body 20 may be changed, and the interval between the blades 30 may be adjusted accordingly. In addition, as described above, each of the blades 30 may be configured to be slidable on the rail 10, and the moving body 20 may also be configured in the form of a chain connecting each of the blades 30. Even in this case, the coupling of the moving body 20 and the blade 30 may be configured in a form in which readjustment is possible. FIG. 9 is a view illustrating a coupling relationship between a rail, a moving body, and a blade according to an aspect. As illustrated in FIG. 9, a plurality of blades 30 may be provided to be slidably movable on the rail 10, and the moving body 20 conjuncts with each of the blades 30 and may be provided in a form in which the coupling position may be readjusted. However, the view illustrating a coupling relationship between the rail, the moving body and the blade in FIG. 9 is an exemplary form, and various embodiments in which the moving body 20 and/or the blade 30 are slidably movable on the rail 10 may be employed.

Figure 11:
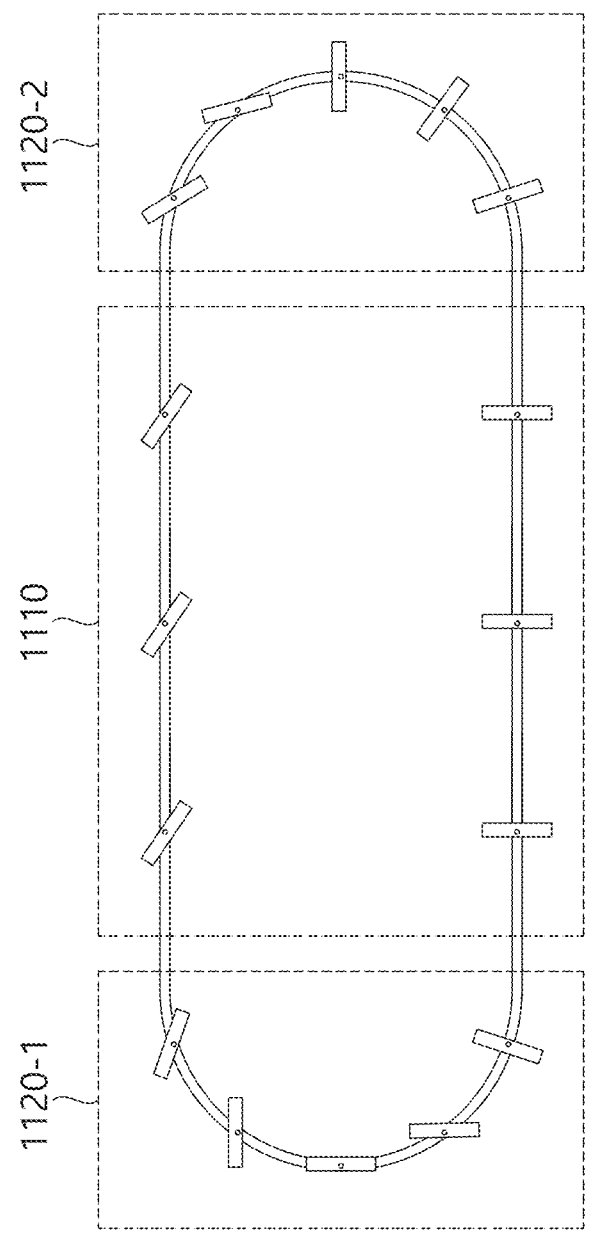
FIG. 11 is a top view of a wind power generation system with an adjustable blade interval.

FIG. 10 is a top view of a wind power generation system according to an aspect. FIG. 11 is a top view of a wind power generation system with an adjustable blade interval. In terms of adjusting the rotation speed of the power generator central rotary shaft, a form in which the moving speed of the blade is controlled is possible. As illustrated in FIG. 11, the rail may include a straight section 1110 and curved sections 1120-1 and 1120-2, and the plurality of blades may be configured to be arranged at narrower intervals when positioned in the curved sections 1120-1 and 1120-2 than when positioned in the straight section 1110.

The wind power generation system according to an embodiment of the present invention may be configured such that the rail 10 forms a loop, as illustrated in FIG. 2, and may further include an inner loop formed inside the loop to provide a shorter movement path than the loop, wherein the power generator may be configured to have a predetermined target rotation speed, and may be configured to rotate in conjunction with the movement of at least one of the moving body and the blades of any one of the loop and the inner loop to achieve a rotation speed closer to the target rotation speed based on information on a wind speed.

Figure 13:
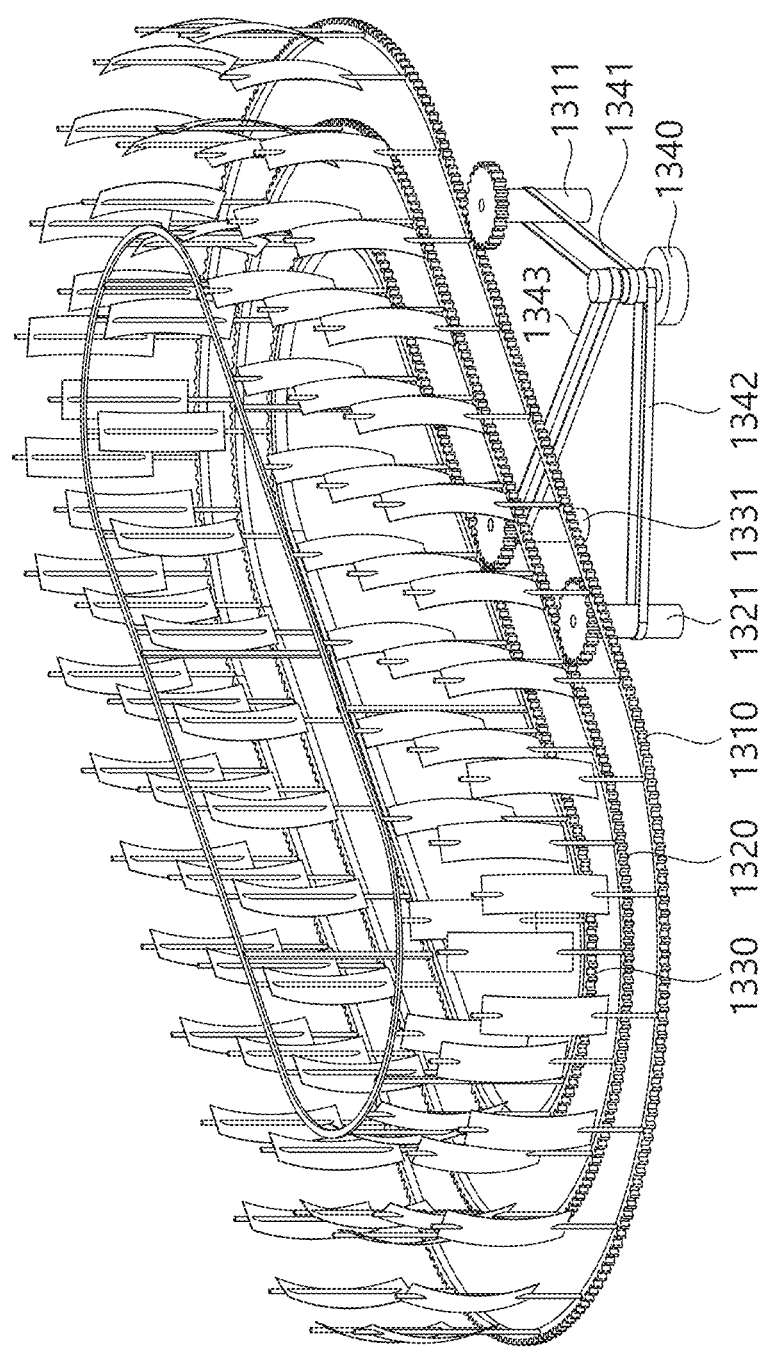
FIG. 13 is an exemplary view of a wind generation power system capable of gear shift.

More specifically, FIG. 13 is an exemplary view of a wind power generation system capable of gear shift. As illustrated in FIG. 13, the wind power generation system according to an embodiment of the present invention may include a loop 1310, a first inner loop 1320, and a second inner loop 1330. The first inner loop 1320 is configured to have a shorter movement path than the loop 1310, and the second inner loop 1330 is configured to have a shorter movement path than the first inner loop 1320. Even at the same wind speed, the loop 1310, the first inner loop 1320, and the second inner loop 1330 may be configured to have each different moving speeds. As described above, since the power generator may be configured to have a target rotation speed, it may be configured to selectively rotate in conjunction with a loop capable of providing a rotation speed most suitable for the target rotation speed of the power generator according to wind speed. For example, as illustrated in FIG. 13, the power generator central rotary shaft 1340 may be connected to a first rotational conjunction shaft 1311 for the loop 1310 via a first rotating belt 1341, to a second rotational conjunction shaft 1321 for the first inner loop 1320 via a second rotating belt 1342, and to a third rotational conjunction shaft 1331 for the second inner loop 1330 via a third rotating belt 1343. Each of the first rotating belt 1341 to the third rotating belt 1343 may be configured to be on/off in rotational conjunction with the power generator central rotary shaft 1340, so that any one of the first rotating belt 1341 to the third rotating belt 1343 may selectively rotate in conjunction with the power generator central rotary shaft 1340. However, the embodiment illustrated in FIG. 13 is exemplary, and a configuration in which any one of a plurality of loops is selected to rotate the central rotary shaft of the power generator may be achieved through various embodiments such as a gear box.

Herein, the information on a wind speed may be acquired from a wind speed sensor. A single wind speed sensor may be provided, or it may be installed in each loop or each blade to calculate the expected movement speed of each loop according to each wind speed.

In the wind power generation system according to an embodiment of the present invention, measures to protect the blades may be needed in a situation in which the normal operation of the wind power generation system is not guaranteed, such as the occurrence of a typhoon. In this regard, for example, a protective measure of the blade may be performed in a way that a housing unit for storage of the blades is installed, the fastening between the blades is made, or the blade is folded toward the ground.

Figure 14:
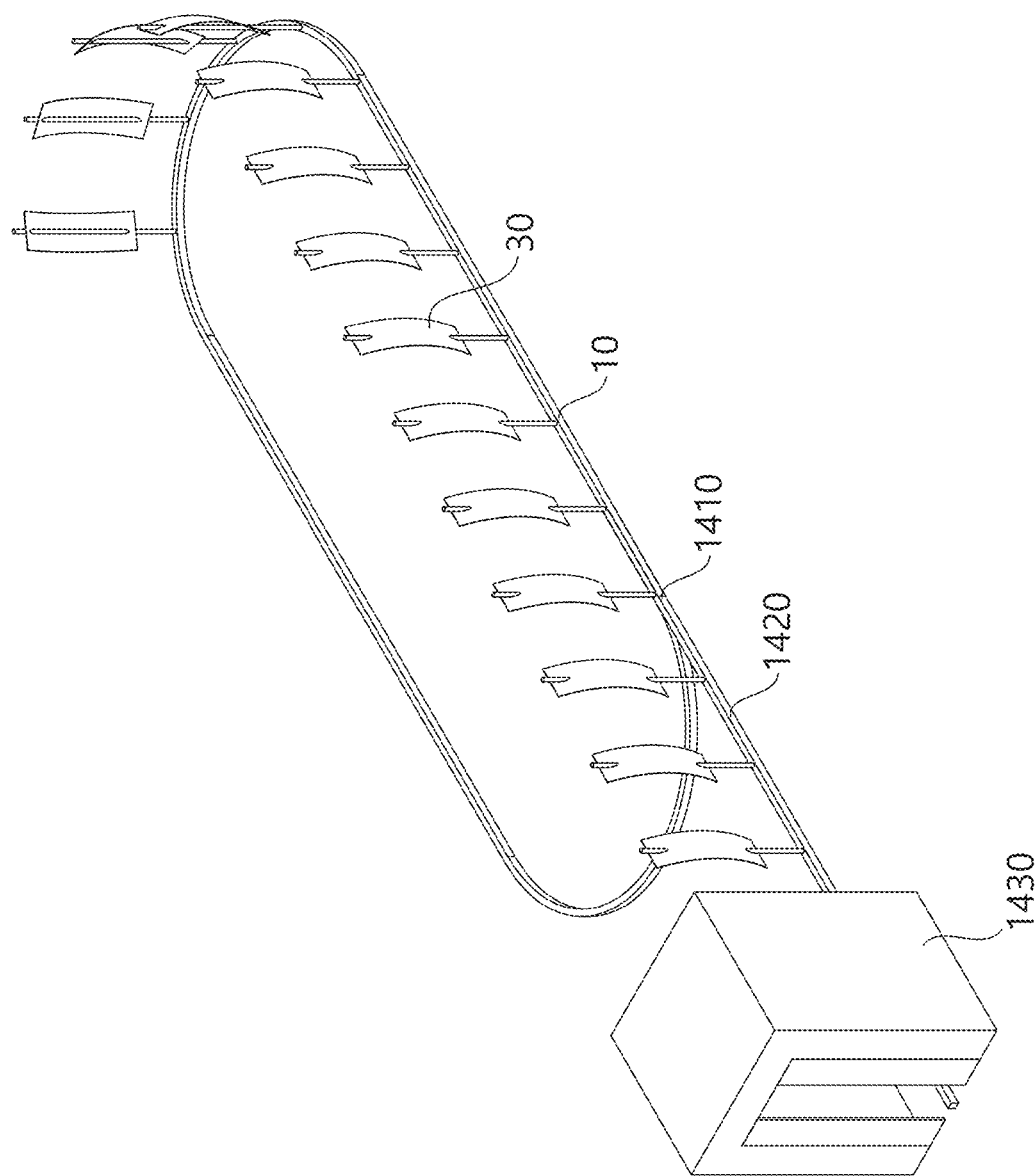
FIG. 14 is an exemplary view of a housing unit built separately.

FIG. 14 is an exemplary view of a housing unit built separately. As illustrated in FIG. 14, the wind power generation system according to an embodiment of the present invention may further include: a housing unit 1430 in which a plurality of blades are housed; a junction 1410 included in a rail; and a housing rail 1420 for providing a movement path from the junction to the housing unit, wherein the plurality of blades 30 may be configured to be housed in the housing unit 1430 via the junction 1410 and the housing rail 1420. As described above, the coupling relationship of the moving body 20 and/or the blade 30 to the rail 10 may be implemented in various embodiments. When the blade 30 itself is configured to be slidably movable on the rail 10, the blades 30 may be moved as a measure from the junction 1410 on the rail 10 to the housing rail 1420 when protective measures are needed, and may be slidably moved along the housing rail 1420 to be housed in the housing unit 1430 as a measure. In another embodiment, the moving body 20 may be slidably moved on the rail 10, and the blade 30 may be provided so that an installation position with respect to the moving body 20 may be changed. In this embodiment, the moving body 20 may be configured such that a portion of the loop is separable, and at a time when a protective measure of the blade is needed, a portion of the loop of the moving body 20 may be separated and moved to extend along the housing rail 1420 to the housing unit 1430 via the junction 1410. Since the installation position of the blade on the moving body 20 may be changed, the blades may be moved on the moving body 20 extending along the housing rail 1420 and housed in the housing unit 1430.

Figure 15:
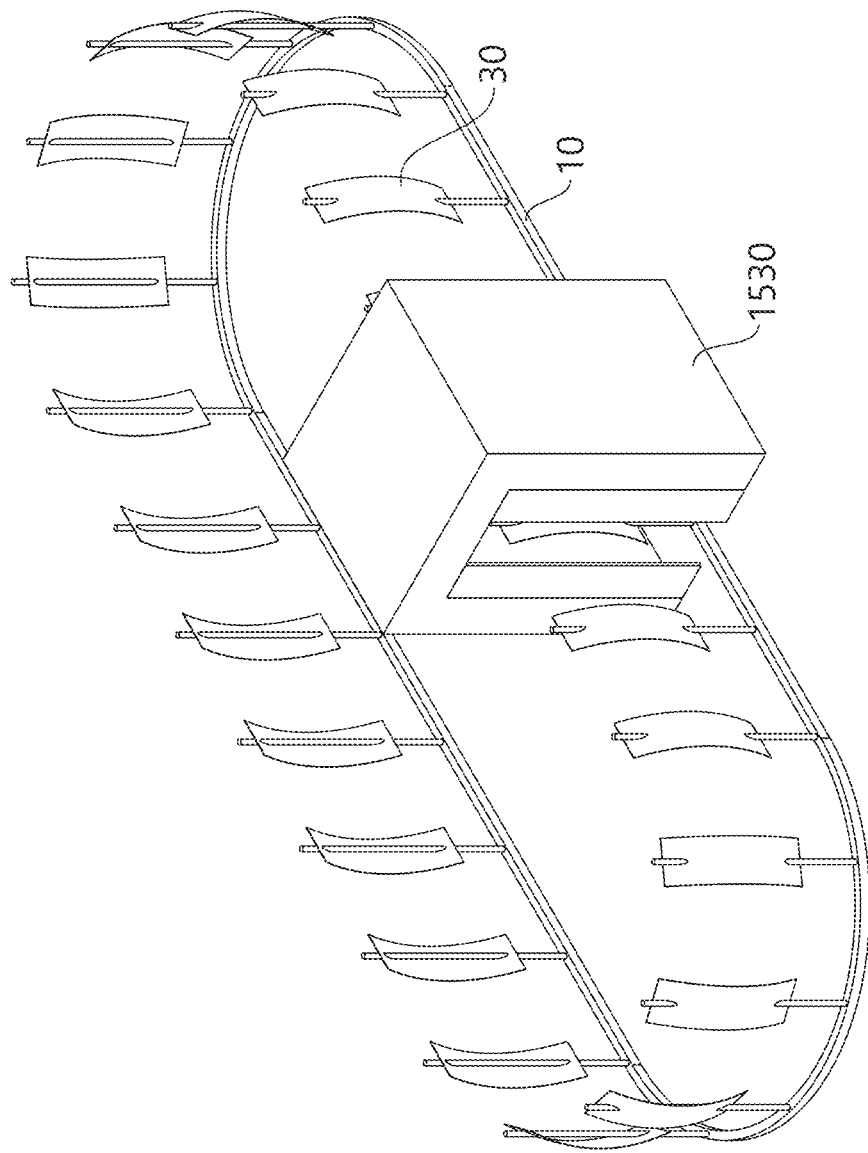
FIG. 15 is an exemplary view of a housing unit built on a rail.

FIG. 15 is an exemplary view of a housing unit built on a rail. As illustrated in FIG. 15, the wind power generation system according to an embodiment of the present invention may further include a housing unit 1530 configured to pass through the rail 10, and the plurality of blades 30 may be configured to be housed in the housing unit 1530 by moving along the rail 10. Also in the embodiment illustrated by FIG. 15, as in FIG. 14, the blades 30 may be moved to the housing unit 1530 in various ways according to the coupling relationship of the moving body and/or the blade with the rail.

Figure 16:
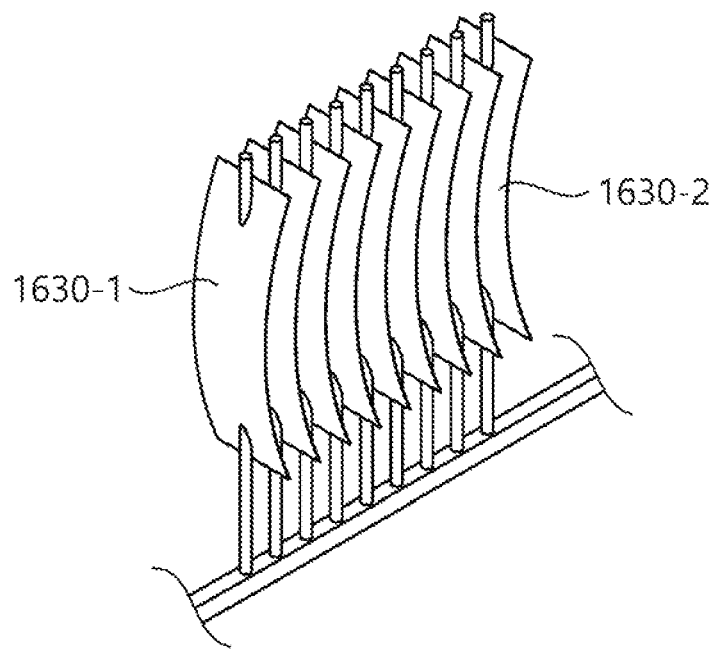
FIG. 16 is an exemplary view of a fastening form between blades.

FIG. 16 is an exemplary view of a fastening form between blades. As illustrated in FIG. 16, a plurality of blades of a blade 1630-1 to a blade 1630-2 may be coupled to each other when protective measures against typhoons are needed.

According to an aspect, each of the plurality of blades may include a fastening unit for coupling with an adjacent blade when an interval between the plurality of blades is minimized. In other words, as a result, the plurality of blades are all coupled through fastening between adjacent blades, thereby improving resistance to typhoons.

According to another aspect, the plurality of blades may include a first blade 1630-1 positioned on a leftmost side and a second blade 1630-2 positioned on a rightmost side when an interval between the plurality of blades is minimized, wherein the first blade 1630-1 and the second blade 1630-2 may each have a fastening unit, and the plurality of blades may be coupled by the fastening unit of the first blade and the fastening unit of the second blade that are fastened to each other. In addition, a configuration in which a plurality of blades are coupled through various embodiments is possible.

Figure 17:
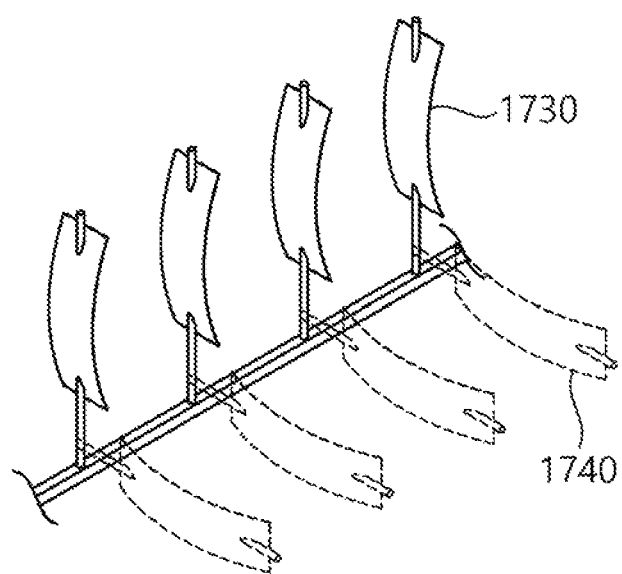
FIG. 17 is an exemplary view of a blade foldable in a ground direction.

FIG. 17 is an exemplary view of a blade foldable in a ground direction. As illustrated in FIG. 17, each of the plurality of blades may be configured to be foldable toward a ground direction. The blades that are normally positioned in a normal position 1730 and generate power based on wind energy are folded to a ground adjacent position 1740 at a time when protective measures are needed, such as a risk of typhoon, to minimize the influence of the wind.

Figure 18:
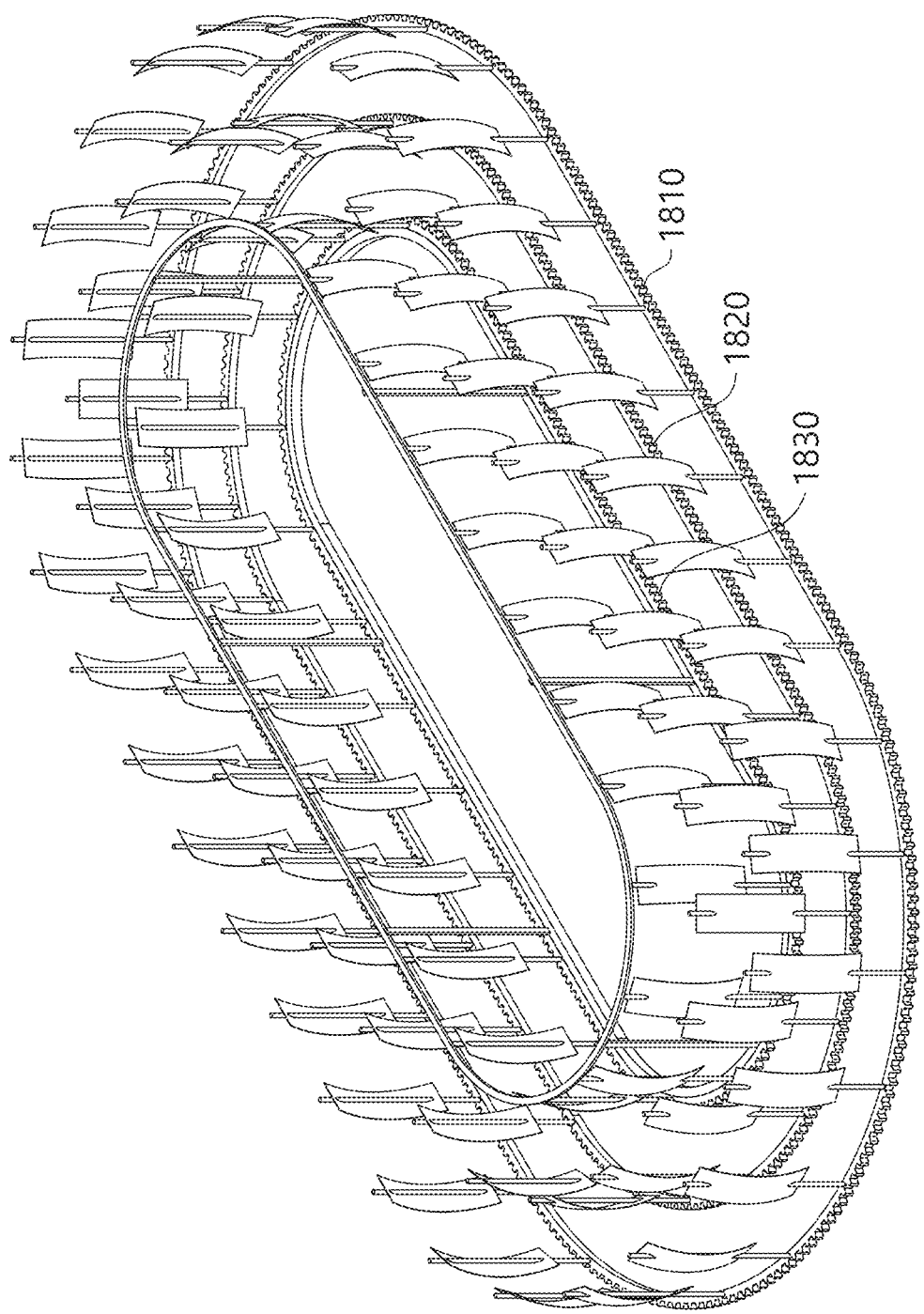
FIG. 18 is an exemplary view of an arrangement form of a plurality of rails having concentricity.
Figure 19:
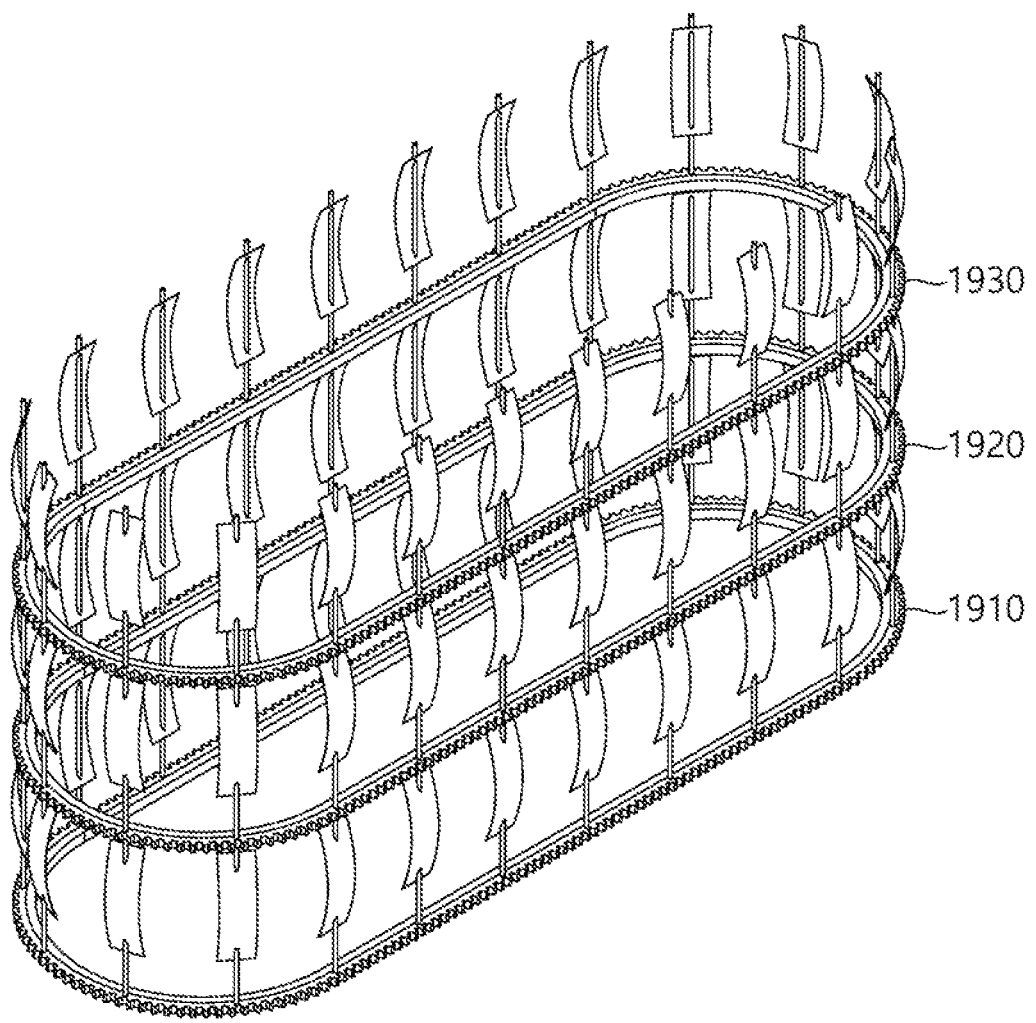
FIG. 19 is an exemplary view of an arrangement form of a plurality of layered rails.

It is possible to configure the wind power generation system according to an embodiment of the present invention in the form of a wind farm capable of generating a large amount of electricity. In this regard, FIG. 18 is an exemplary view of an arrangement form of a plurality of rails having concentricity, and FIG. 19 is an exemplary view of an arrangement form of a plurality of layered rails. As illustrated in FIG. 18, a first loop 1810, a second loop 1820, and a third loop 1830 are concentrically arranged to have different moving lengths, so that space utilization can be improved. Alternatively, as illustrated in FIG. 19, the first loop 1810, the second loop 1820, and the third loop 1830 are sequentially stacked in a vertical direction to improve space utilization. The embodiments of FIGS. 18 and 19 may be implemented in combination.

Although the rail in the drawings is illustrated in a completely horizontal form on the ground, a considerable level of curvature may also be applied to the rail depending on the terrain. In addition, it is also possible to implement a rail in a form including a number of curves rather than a straight line form. In the present invention, a "horizontal direction" should be understood to include all directions having an approximate inclination other than a vertical direction as well as the complete horizontal direction as described above.

Second Embodiment

Figure 20:
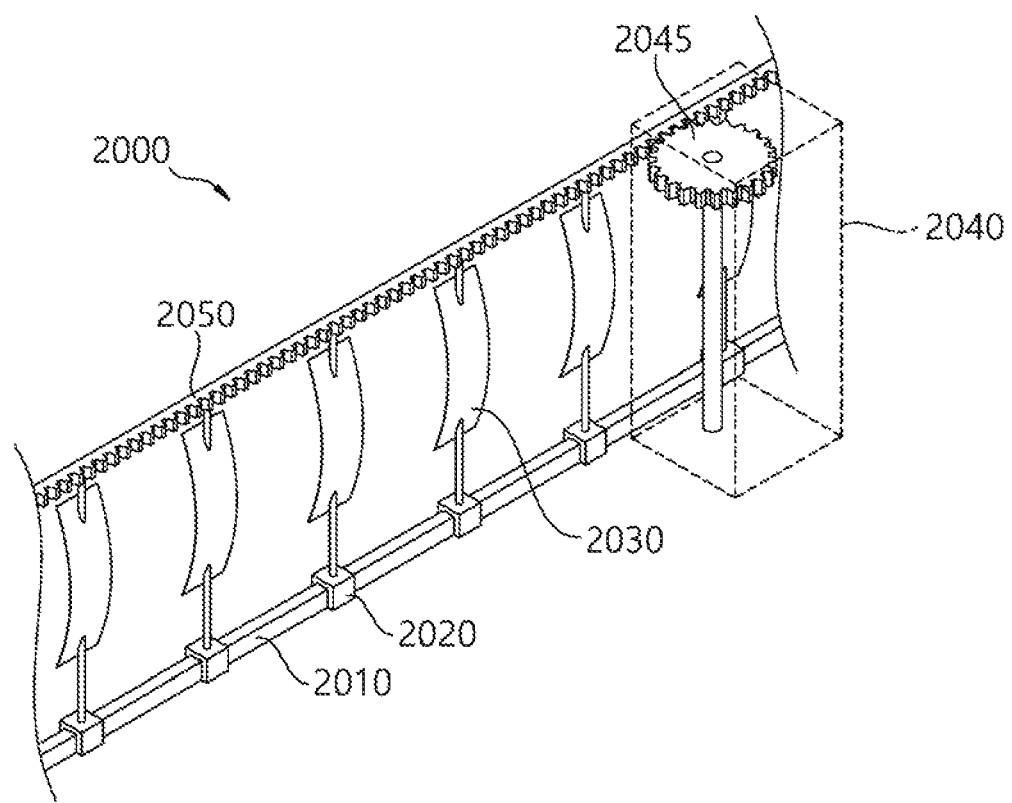
FIG. 20 is a conceptual view of a wind power generation system according to a second embodiment of the present invention.

FIG. 20 is a conceptual view of a wind power generation system according to a second embodiment of the present invention. As illustrated in FIG. 20, a wind power generation system 2000 according to an embodiment of the present invention may include a rail 2010, a moving body 2020, a plurality of blades 2030, a coupling body 2050, and a nacelle 2040 having a power generator.

The rail 2010 may provide a horizontal movement path through which the plurality of moving bodies 2020 slide and move. Here, the horizontal direction may be roughly understood as a movement path along the ground or water surface as well as a complete horizontal direction in a mathematical sense as described above. In the embodiment illustrated through FIG. 20, it is exemplified as providing a movement path so that the moving body 2020 is slid on the rail 2010. However, as previously illustrated for example in FIG. 1 or 2, the rail 2010 may have various design forms that may provide a movement path through which the moving body 2020 may slide and move, including a form that the rail 2010 provides a movement path from a side of the moving body 2020. As illustrated in FIG. 20, the rail 2010 according to an embodiment of the present invention may be installed on the ground or installed through a support to provide a movement path in a horizontal direction of the moving bodies 2020.

The plurality of moving bodies 2020 may be configured to slide and move along the movement path provided by the rail 2010. Here, each of the plurality of moving bodies 2020 may be installed on each of the plurality of moving bodies and may have the blade 2030 to provide power for moving each of the plurality of moving bodies based on energy from the wind. In other words, each moving body 2020 may slide and move along a movement path provided by the rail 2010 according to the power of the blade 2030 based on the wind.

In other words, the plurality of blades 2030 may be installed on the moving body 2020 to provide power for movement of the moving body 2020 based on energy from wind. In other words, when the wind blows, the energy provided by the wind acts on the blades 2030, and the blades 2030 and the moving body 2020 to which the blades are connected are configured to move. In the embodiment illustrated in FIG. 20, it is exemplified that the moving body 2020 contacts the rail 2010 and the blades 30 are installed on the moving body 2020, but the installation form and structure of the rail 2010, the moving body 2020, and the blades 2030 may be employed in various modifications.

As illustrated in FIG. 20, there may be provided a coupling body 2050 fastened to an upper end of a blade provided in each of the plurality of moving bodies and moving based on power provided by the blade. In an aspect, the coupling body 2050 may also be integrally formed as illustrated in FIG. 20, and in another aspect, the coupling body 2050 may be in the form of a chain having a plurality of segment structures. Further, according to the embodiment, the coupling body 2050 may be configured of a flexible material.

Referring back to FIG. 20, the nacelle 2040 having a power generator may be arranged to be adjacent to the coupling body 2050. According to an aspect, the power generator may be a power generator that generates electricity according to the rotation of a power generator central shaft gear 2045 coupled to a power generator central rotary shaft, and the central rotary shaft of the power generator may be configured to rotate in conjunction with the movement of the coupling body 2050. FIG. 20 exemplarily illustrates a configuration in which the power generator central rotary shaft rotates in conjunction with the movement of the coupling body 2050.

In this regard, as previously described in relation to the first embodiment, FIG. 3 illustrates a power transfer structure between a blade and/or a moving body and a power generator central rotary shaft according to a first aspect. FIG. 4 illustrates a power transfer structure between a blade and/or a moving body and a power generator central rotary shaft according to a second aspect. In this regard, the power transfer structure of FIGS. 3 and 4 may also be employed in the power transfer structure between the coupling body 2050 and the power generator central rotary shaft of the second embodiment.

For example, as illustrated in FIG. 3, the power generator may have a power generator central rotary shaft 45c and a circular toothed gear 45 coupled to the power generator central rotary shaft 45c, a plurality of toothed threads may be provided on a surface facing the power generator of the coupling body 2050 (FIG. 20), and the power generator central rotary shaft 45c may be configured to rotate as the toothed threads move in engagement with toothed threads 45a of the circular toothed gear 45 according to the movement of the coupling body 2050.

For a similar purpose, the features of the present invention described below with reference to the first embodiment and related drawings may also be applied to the second embodiment. In the following description, it will be described together with the reference numerals of the rail and the moving body of the first embodiment, but those skilled in the art will be able to easily apply to the second embodiment according to the description.

FIG. 12 is an exemplary view of the arrangement of a power generator central rotary shaft. As illustrated in FIG. 12, the power generator central shaft may have various embodiments in relation to the rail. According to an aspect, in an embodiment in which the rail 10 and the moving body 20 form a loop as illustrated in FIG. 12, power generator central rotary shafts 1210 and 1220 may also be positioned outside the loop, and may also be positioned inside the loop.

In addition, the power generator central rotary shafts 1210 and 1220 may also rotate directly in conjunction with the movement of the coupling body 2050, and may also be configured to rotate in conjunction with a medium unit such as a power generator central rotary shaft 1230. The wind power generation system according to an embodiment of the present invention may further include a power transfer shaft 1231 that rotates in conjunction with the movement of the coupling body 2050, and a rotation pulley provided on the power transfer shaft 1231 and a rotation pulley provided on the power generator central rotary shaft 1230 of the power generator may also be configured to rotate in conjunction with a rotating belt 1233. The rotating belt 1233 may also be configured, for example, in the form of a conveyor belt or chain.

Referring to FIGS. 1 and 2, in the wind power generation system according to an embodiment of the present invention, the rail 10 may be configured to form a loop. According to an aspect, in the second embodiment, the rail 2010 may further include an upper frame supported by a plurality of upper frame supports, wherein the upper frame may be configured to maintain coupling body 2050 movably to improve the standing stability of the blades 2030.

Since the rails 10 and 2010 are formed as a loop, the movement path of the plurality of blades and/or the moving body may have a circulating structure. Herein, each of the plurality of blades 2030 may be configured to adaptively rotate to maximize power in a target movement direction based on information on a wind direction and information on the target movement direction determined according to a position of each of the plurality of blades 2030 in the loop.

According to another aspect, each of the plurality of blades 2030 may be configured of a flexible material and have a plurality of air pockets, and may also be configured to be deformed into a shape that maximizes power in a target movement direction by controlling an air filling amount for at least one air pocket among the plurality of air pockets based on information on a wind direction and information on the target movement direction determined according to a position of each of the plurality of blades in the loop.

The target movement direction will be described in more detail with reference to FIG. 10. FIG. 10 is a top view of a wind power generation system according to an aspect. As illustrated in FIG. 10, according to an embodiment of the present invention, the loop formed by the rail 10 may include, for example: a first portion 1010 for providing a movement path in a first direction; a second portion 1030 for providing a movement path in a second direction opposite to the first direction; a first joint portion 1020 for providing a movement path from the first portion to the second portion; and a second joint portion 1040 for providing a movement path from the second portion to the first portion. For example, the blades may be configured to move clockwise within the loop. Accordingly, the target movement direction of the blades in the first portion 1010 may be a (right→left) direction in FIG. 10, and the target movement direction of the blades in the first joint portion 1020 is gradually changed from a (right→left) direction to a (downward→upward) direction, and again in a (left→right) direction, depending on the extent to which the blades have moved from the first portion 1010 to the second portion 1030. The target movement direction of the blades in the second portion 1030 is determined in a (left→right) direction, and the target movement direction of the blades in the second joint portion 1040 is gradually changed from a (left→right) direction to a (upward→downward) direction, and again in a (right→left) direction, depending on the extent to which the blades have moved from the second portion 1030 to the first portion 1010. In other words, the target movement direction of the blades may be determined differently according to a position of each blade in the loop.

When the target movement direction of each blade is determined, based on the information on a wind direction, each blade may be configured to adaptively rotate so that the orientation of each blade is changed to maximize the power in the target movement direction of each blade. For example, rotation of each of the plurality of blades may be performed based on a rotary shaft perpendicular to the ground.

For example, each of the plurality of blades may be configured to rotate in a direction to perform leeward sailing, in response to a determination that the target movement direction coincides with a wind direction, and each of the plurality of blades may be configured to rotate in a direction to perform windward sailing, in response to a determination that the target movement direction is opposite to the wind direction. In FIG. 10, when the wind direction is a (right→left) direction, the blade may be rotated in the direction to perform the leeward sailing in the first portion 1010, and the blade may be rotated in the direction to perform the windward sailing in the second portion 1030. In the first joint portion 1020 and the second joint portion 1030, the blade may be rotated to maximize power according to the target movement direction according to the positions of the respective blades.

According to an aspect of the present invention, each blade may be configured in a form such as a sail of a sailing yacht. Each blade may be provided with a support, and a thin film in the form of a sail may be configured to be held by the support. Accordingly, it is possible to configure the wind power generation system according to an aspect of the present invention at a significantly reduced facility cost compared to a conventional wind power generator having a large rotor blade. The thin film in the form of a sail may be formed of a tent material such as hemp cloth or cotton cloth, or a synthetic fiber such as tetron, or a polymer fusion material may also be used.

As described above, with respect to the principle of Bernoulli's theorem and/or the adjustment principle of the heading direction of a sailing yacht, it is possible to deform each of the blades 30 to have a shape that maximizes power in a target movement direction. For example, according to Bernoulli's theorem, by varying the airflow velocity on either side of the blade by increasing the gradient on one side of the blade and making it larger relative to the gradient on the other side, it may be configured to generate power from one specific side of the blade to the opposite side.

In an exemplary embodiment, each of the plurality of blades may be made of a flexible material and have a plurality of air pockets, and may be configured to selectively change an air filling amount in a specific air pocket among the plurality of air pockets. Accordingly, it is possible to implement a shape in which the blade has power in a desired direction under a predetermined wind condition. An air pump may be used, for example, to change the air filling amount.

In another embodiment, a blade in the form of a thin film that does not have a separate air pocket may be controlled by a support in the form of a grid that may change an angle in units of segments, and it may also be configured to deform the blade into a shape that maximizes power in a desired movement direction under a given wind condition by changing an amount of rotation in units of each grid cell.

According to an aspect of the present invention, the rotation of each blade may be, for example, performed based on a rotary shaft perpendicular to the ground. FIG. 7 is a cross-sectional view of a blade support according to an aspect. As illustrated in FIG. 7, the support of each blade may include an upper support 31 configured to support a thin film in the form of a sail and a lower support 32 to which the upper support 31 is rotatably coupled. The lower support 32 provides a cavity through which a blade rotary shaft 35 coupled to the upper support 31 may pass. The blade rotary shaft 35 may be connected to a motor shaft 34 to rotate the upper support by rotation based on the rotary force from a motor 33, and may adjust the orientation of a thin film in the form of a sail in a desired direction.

FIG. 8 is an exemplary view of a highly detachable blade according to an aspect. In the wind power generation system according to an aspect of the present invention, an appropriate blade size for maximizing electricity generation efficiency may be a fairly large scale, and a wind direction may be different depending on the altitude. Accordingly, in order to maximize power in a target movement direction of the blade 30, even when a wind direction is different depending on the altitude, the blade has a first portion 37a, a second portion 37b, and a third portion 37c divided according to the attitude, and has a first joint 38a, a second joint 38b, and a third joint 38c. By configuring each joint portion to be rotatable, respectively, it is possible to set the orientation of a thin film in the form of a sail included in each portion differently. In other words, each of the plurality of blades 30 may have a first partial blade and a second partial blade divided in a height direction, the first partial blade and the second partial blade may be configured to be rotatable independently of each other, and the first partial blade and the second partial blade may be rotated to maximize power in the target movement direction of the blade 30 based on information on a wind direction at each arranged height.

The acquisition of position information for determining the target movement direction of the blade and information on a wind direction may be achieved by employing any of the conventional sensor systems, and the control system for determining and changing the orientation of the blade may also select any of the conventional control systems.

For example, the information on a position of each of the plurality of blades in the loop may be acquired by receiving a position identification signal from at least one of a position identification signal generation device provided in a plural number in the loop by a position signal reception device provided in each of the plurality of blades. In another aspect, position information of each blade may be determined by a positioning system such as GPS. The target movement direction according to the position of the blade may be determined according to table information stored in the database, or a computing device may be configured to calculate in real time based on each position and the loop shape. The information on a wind direction may be acquired from a wind direction sensor provided in each of the plurality of blades, and accurate information on a wind direction for each blade may be used. The control system for performing a calculation such as orientation determination may be set to be provided with a separate computing device or processor for each blade, or by having an integrated control system configured to transmit and receive information to and from each blade, the integrated control system may be configured to control each blade.

Referring back to FIG. 2, the wind power generation system 100 according to an embodiment of the present invention may have a plurality of nacelles. For example, the nacelle 40 may have a power generator having a power generator central shaft gear 45-1, and may also further have a separate nacelle including an additional power generator having a power generator central shaft gear 45-2.

Depending on the form of a wind power generator, the power generator provided in the nacelle 40 may be configured to have a predetermined target rotation speed. Alternatively, it may be required to adjust the target rotation speed as needed.

In this regard, in the second embodiment, each of the coupling body 2050 and the plurality of blades 2030 may be movably fastened to adjust an interval between the plurality of blades. Here, according to an aspect, the coupling body 2050 may also be configured in the form of a chain connecting each blade 2030. Even in this case, the coupling of the coupling body 2050 and the blade 2030 may be configured in a form in which readjustment is possible.

FIG. 10 is a top view of a wind power generation system according to an aspect. FIG. 11 is a top view of a wind power generation system with an adjustable blade interval. In terms of adjusting the rotation speed of the power generator central rotary shaft, a form in which the moving speed of the blade is controlled is possible. As illustrated in FIG. 11, the rail may include a straight section 1110 and curved sections 1120-1 and 1120-2, and the plurality of blades may be configured to be arranged at narrower intervals when positioned in the curved sections 1120-1 and 1120-2 than when positioned in the straight section 1110.

The wind power generation system according to an embodiment of the present invention may be configured such that the rail 2010 forms a loop, and may further include an inner loop formed inside the loop to provide a shorter movement path than the loop, wherein the power generator may be configured to have a predetermined target rotation speed, and may be configured to rotate in conjunction with the movement of the coupling body of any one of the loop and the inner loop to achieve a rotation speed closer to the target rotation speed based on information on a wind speed.

More specifically, FIG. 13 is an exemplary view of a wind power generation system capable of gear shift. As illustrated in FIG. 13, the wind power generation system according to an embodiment of the present invention may include a loop 1310, a first inner loop 1320, and a second inner loop 1330. The first inner loop 1320 is configured to have a shorter movement path than the loop 1310, and the second inner loop 1330 is configured to have a shorter movement path than the first inner loop 1320. Even at the same wind speed, the loop 1310, the first inner loop 1320, and the second inner loop 1330 may be configured to have each different moving speeds. As described above, since the power generator may be configured to have a target rotation speed, it may be configured to selectively rotate in conjunction with a loop capable of providing a rotation speed most suitable for the target rotation speed of the power generator according to wind speed. For example, as illustrated in FIG. 13, the power generator central rotary shaft 1340 may be connected to a first rotational conjunction shaft 1311 for the loop 1310 via a first rotating belt 1341, to a second rotational conjunction shaft 1321 for the first inner loop 1320 via a second rotating belt 1342, and to a third rotational conjunction shaft 1331 for the second inner loop 1330 via a third rotating belt 1343. Each of the first rotating belt 1341 to the third rotating belt 1343 may be configured to be on/off in rotational conjunction with the power generator central rotary shaft 1340, so that any one of the first rotating belt 1341 to the third rotating belt 1343 may selectively rotate in conjunction with the power generator central rotary shaft 1340. However, the embodiment illustrated in FIG. 13 is exemplary, and a configuration in which any one of a plurality of loops is selected to rotate the central rotary shaft of the power generator may be achieved through various embodiments such as a gear box.

Herein, the information on a wind speed may be acquired from a wind speed sensor. A single wind speed sensor may be provided, or it may be installed in each loop or each blade to calculate the expected movement speed of each loop according to each wind speed.

In the wind power generation system according to an embodiment of the present invention, measures to protect the blades may be needed in a situation in which the normal operation of the wind power generation system is not guaranteed, such as the occurrence of a typhoon. In this regard, for example, a protective measure of the blade may be performed in a way that a housing unit for storage of the blades is installed, the fastening between the blades is made, or the blade is folded toward the ground.

FIG. 14 is an exemplary view of a housing unit built separately. As illustrated in FIG. 14, the wind power generation system according to an embodiment of the present invention may further include: a housing unit 1430 in which a plurality of blades are housed; a junction 1410 included in a rail; and a housing rail 1420 for providing a movement path from the junction to the housing unit, wherein the plurality of blades 30 may be configured to be housed in the housing unit 1430 via the junction 1410 and the housing rail 1420. When the plurality of the moving bodies is configured to be slidably movable on the rail 2010, the moving bodies 2020 having the blade 2030 may be moved as a measure from the junction 1410 on the rail 2010 to the housing rail 1420 when protective measures are needed, and may be slidably moved along the housing rail 1420 to be housed in the housing unit 1430 as a measure.

FIG. 15 is an exemplary view of a housing unit built on a rail. As illustrated in FIG. 15, the wind power generation system according to an embodiment of the present invention may further include a housing unit 1530 configured to pass through the rail 10, and the plurality of blades 30 may be configured to be housed in the housing unit 1530 by moving along the rail 10. In the second embodiment, the plurality of moving bodies 2020 having the blade 2030 may move along the rail 2010 to be housed in the housing unit.

FIG. 16 is an exemplary view of a fastening form between blades. As illustrated in FIG. 16, a plurality of blades of a blade 1630-1 to a blade 1630-2 may be coupled to each other when protective measures against typhoons are needed.

According to an aspect, each of the plurality of blades may include a fastening unit for coupling with an adjacent blade when an interval between the plurality of blades is minimized. In other words, as a result, the plurality of blades are all coupled through fastening between adjacent blades, thereby improving resistance to typhoons.

According to another aspect, the plurality of blades may include a first blade 1630-1 positioned on a leftmost side and a second blade 1630-2 positioned on a rightmost side when an interval between the plurality of blades is minimized, wherein the first blade 1630-1 and the second blade 1630-2 may each have a fastening unit, and the plurality of blades may be coupled by the fastening unit of the first blade and the fastening unit of the second blade that are fastened to each other. In addition, a configuration in which a plurality of blades are coupled through various embodiments is possible.

Third Embodiment

Figure 21:
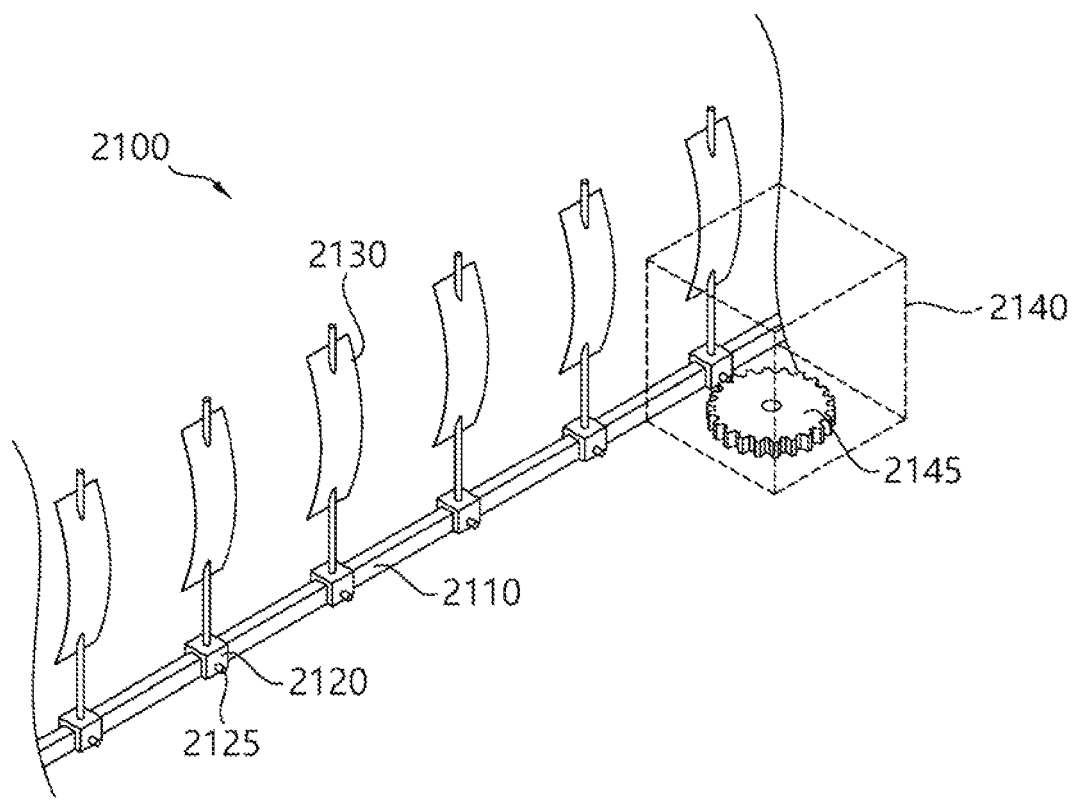
FIG. 21 is a conceptual view of a wind power generation system according to a third embodiment of the present invention.
Figure 22:
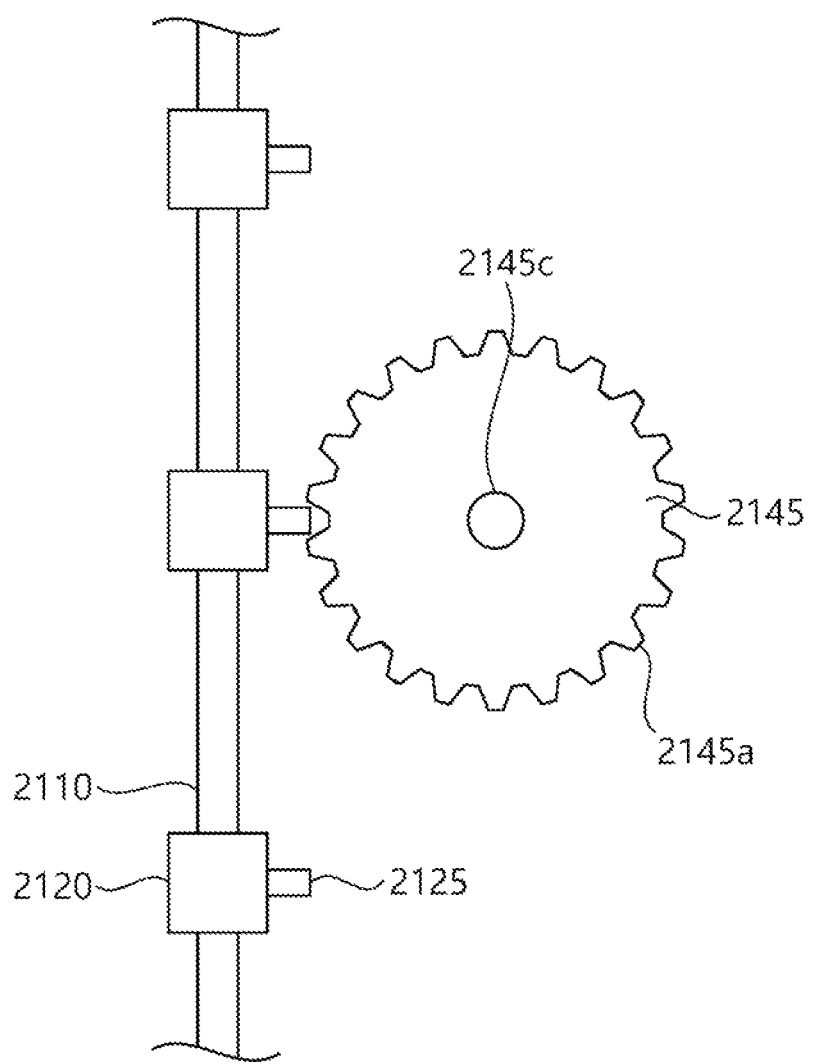
FIG. 22 illustrates a power transfer structure between a moving body and a power generator central shaft in the embodiment of FIG. 21.

FIG. 21 is a conceptual view of a wind power generation system according to a third embodiment of the present invention. As illustrated in FIG. 22, a wind power generation system 2100 according to an embodiment of the present invention may include a rail 2110, a moving body 2120, a plurality of blades 2130, and a nacelle 2140 having a power generator.

The rail 2110 may provide a horizontal movement path through which the plurality of moving bodies 2120 slide and move. Here, the horizontal direction may be roughly understood as a movement path along the ground or water surface as well as a complete horizontal direction in a mathematical sense as described above. In the embodiment illustrated through FIG. 21, it is exemplified as providing a movement path so that the moving body 2120 is slid on the rail 2110. However, as previously illustrated for example in FIG. 1 or 2, the rail 2110 may have various design forms that may provide a movement path through which the moving body 2120 may slide and move, including a form that the rail 2110 provides a movement path from a side of the moving body 2120. As illustrated in FIG. 21, the rail 2110 according to an embodiment of the present invention may be installed on the ground or installed through a support to provide a movement path in a horizontal direction of the moving bodies 2120.

The plurality of moving bodies 2120 may be configured to slide and move along the movement path provided by the rail 2110. Here, each of the plurality of moving bodies 2120 may be installed on each of the plurality of moving bodies and may have the blade 2130 to provide power for moving each of the plurality of moving bodies based on energy from the wind. In other words, each moving body 2120 may slide and move along a movement path provided by the rail 2110 according to the power of the blade 2130 based on the wind.

In other words, the plurality of blades 2130 may be installed on the moving body 2120 to provide power for movement of the moving body 2120 based on energy from wind. In other words, when the wind blows, the energy provided by the wind acts on the blades 2130, and the blades 2130 and the moving body 2120 to which the blades are connected are configured to move. In the embodiment illustrated in FIG. 21, it is exemplified that the moving body 2120 contacts the rail 2110 and the blades 2130 are installed on the moving body 2120, but the installation form and structure of the rail 2110, the moving body 2120, and the blades 2130 may be employed in various modifications.

Referring back to FIG. 21, the nacelle 2140 having a power generator may be arranged to be adjacent to the moving body 2120 and/or the blade 2130. According to an aspect, the power generator may be a power generator that generates electricity according to the rotation of a power generator central shaft gear 2145 coupled to a power generator central rotary shaft, and the central rotary shaft of the power generator may be configured to rotate in conjunction with the movement of at least one of the moving body 2120 and the blade 2130. FIG. 21 illustrates a configuration in which the power generator central rotary shaft rotates in conjunction with the movement of the moving body 2120. In this regard, in the exemplary embodiment of FIG. 21, a power transfer rod 2125 may be provided on a surface facing the power generator of the moving body 2120.

More specifically, FIG. 22 illustrates a power transfer structure between a moving body and a power generator central rotary shaft in the embodiment of FIG. 21. As illustrated in FIG. 22, the power generator may have a power generator central rotary shaft 2145c and a circular toothed gear 2145 coupled to the power generator central rotary shaft 2145c. For example, a blade power transfer rod 2125 may be provided on a side facing the power generator of the moving body 2120, and the power generator central rotary shaft 2145c may be configured to rotate by acting on a gear toothed thread 2145a formed on the power generator central shaft gear 2145 while the blade power transfer rod 2125 moves. Unlike that illustrated in FIG. 22, a power transfer rod may be provided on a side facing the power generator of the blade 2130 and may also be configured to induce rotation of the central rotary shaft 2145c.

For a similar purpose, the features of the present invention described below with reference to the third embodiment and related drawings may also be applied to the second embodiment. In the following description, it will be described together with the reference numerals of the rail and the moving body of the first embodiment, but those skilled in the art will be able to easily apply it to the third embodiment according to the description.

FIG. 12 is an exemplary view of the arrangement of a power generator central rotary shaft. As illustrated in FIG. 12, the power generator central shaft may have various embodiments in relation to the rail. According to an aspect, in an embodiment in which the rail 10 and the moving body 20 form a loop as illustrated in FIG. 2 or FIG. 12, power generator central rotary shafts 1210 and 1220 may also be positioned outside the loop, and may also be positioned inside the loop. In addition, the power generator central rotary shafts 1210 and 1220 may also rotate directly in conjunction with the movement of the moving body and/or the blades, and may also be configured to rotate in conjunction with a medium unit such as a power generator central rotary shaft 1230. As illustrated in FIG. 12, the wind power generation system according to an embodiment of the present invention may further include a power transfer shaft 1231 that rotates in conjunction with the movement of at least one of the moving body 20 and the blades 30, and a rotation pulley provided on the power transfer shaft 1231 and a rotation pulley provided on the power generator central rotary shaft 1230 of the power generator may also be configured to rotate in conjunction with a rotating belt 1233. The rotating belt 1233 may also be configured, for example, in the form of a conveyor belt or chain.

Referring to FIGS. 1 and 2, in the wind power generation system according to an embodiment of the present invention, the rail 10 may be configured to form a loop. According to an aspect, in the third embodiment, the rail 2110 may further include an upper frame supported by a plurality of upper frame supports, wherein the upper frame may be configured to maintain the blades 2130 provided in the moving body 2120 movably to improve the standing stability of the blades 30.

Since the rails 10 and 2110 are formed as a loop, the movement path of the plurality of blades and/or the moving body may have a circulating structure. Herein, each of the plurality of blades 2130 may be configured to adaptively rotate to maximize power in a target movement direction based on information on a wind direction and information on the target movement direction determined according to a position of each of the plurality of blades 2130 in the loop.

According to another aspect, each of the plurality of blades 2130 may be configured of a flexible material and have a plurality of air pockets, and may also be configured to be deformed into a shape that maximizes power in a target movement direction by controlling an air filling amount for at least one air pocket among the plurality of air pockets based on information on a wind direction and information on the target movement direction determined according to a position of each of the plurality of blades in the loop.

The target movement direction will be described in more detail with reference to FIG. 10. FIG. 10 is a top view of a wind power generation system according to an aspect. As illustrated in FIG. 10, according to an embodiment of the present invention, the loop formed by the rail 10 may include, for example: a first portion 1010 for providing a movement path in a first direction; a second portion 1030 for providing a movement path in a second direction opposite to the first direction; a first joint portion 1020 for providing a movement path from the first portion to the second portion; and a second joint portion 1040 for providing a movement path from the second portion to the first portion. For example, the blades may be configured to move clockwise within the loop. Accordingly, the target movement direction of the blades in the first portion 1010 may be a (right→left) direction in FIG. 10, and the target movement direction of the blades in the first joint portion 1020 is gradually changed from a (right→left) direction to a (downward→upward) direction, and again in a (left→right) direction, depending on the extent to which the blades have moved from the first portion 1010 to the second portion 1030. The target movement direction of the blades in the second portion 1030 is determined in a (left→right) direction, and the target movement direction of the blades in the second joint portion 1040 is gradually changed from a (left→right) direction to a (upward→downward) direction, and again in a (right→left) direction, depending on the extent to which the blades have moved from the second portion 1030 to the first portion 1010. In other words, the target movement direction of the blades may be determined differently according to a position of each blade in the loop.

When the target movement direction of each blade is determined, based on the information on a wind direction, each blade may be configured to adaptively rotate so that the orientation of each blade is changed to maximize the power in the target movement direction of each blade. For example, rotation of each of the plurality of blades may be performed based on a rotary shaft perpendicular to the ground.

For example, each of the plurality of blades may be configured to rotate in a direction to perform leeward sailing, in response to a determination that the target movement direction coincides with a wind direction, and each of the plurality of blades may be configured to rotate in a direction to perform windward sailing, in response to a determination that the target movement direction is opposite to the wind direction. In FIG. 10, when the wind direction is a (right→left) direction, the blade may be rotated in the direction to perform the leeward sailing in the first portion 1010, and the blade may be rotated in the direction to perform the windward sailing in the second portion 1030. In the first joint portion 1020 and the second joint portion 1030, the blade may be rotated to maximize power according to the target movement direction according to the positions of the respective blades.

According to an aspect of the present invention, each blade may be configured in a form such as a sail of a sailing yacht. Each blade may be provided with a support, and a thin film in the form of a sail may be configured to be held by the support. Accordingly, it is possible to configure the wind power generation system according to an aspect of the present invention at a significantly reduced facility cost compared to a conventional wind power generator having a large rotor blade. The thin film in the form of a sail may be formed of a tent material such as hemp cloth or cotton cloth, or a synthetic fiber such as tetron, or a polymer fusion material may also be used.

As described above, with respect to the principle of Bernoulli's theorem and/or the adjustment principle of the heading direction of a sailing yacht, it is possible to deform each of the blades 2130 to have a shape that maximizes power in a target movement direction. For example, according to Bernoulli's theorem, by varying the airflow velocity on either side of the blade by increasing the gradient on one side of the blade and making it larger relative to the gradient on the other side, it may be configured to generate power from one specific side of the blade to the opposite side.

In an exemplary embodiment, each of the plurality of blades may be made of a flexible material and have a plurality of air pockets, and may be configured to selectively change an air filling amount in a specific air pocket among the plurality of air pockets. Accordingly, it is possible to implement a shape in which the blade has power in a desired direction under a predetermined wind condition. An air pump may be used, for example, to change the air filling amount.

In another embodiment, a blade in the form of a thin film that does not have a separate air pocket may be controlled by a support in the form of a grid that may change an angle in units of segments, and it may also be configured to deform the blade into a shape that maximizes power in a desired movement direction under a given wind condition by changing an amount of rotation in units of each grid cell.

According to an aspect of the present invention, the rotation of each blade may be, for example, performed based on a rotary shaft perpendicular to the ground. FIG. 7 is a cross-sectional view of a blade support according to an aspect. As illustrated in FIG. 7, the support of each blade may include an upper support 31 configured to support a thin film in the form of a sail and a lower support 32 to which the upper support 31 is rotatably coupled. The lower support 32 provides a cavity through which a blade rotary shaft 35 coupled to the upper support 31 may pass. The blade rotary shaft 35 may be connected to a motor shaft 34 to rotate the upper support by rotation based on the rotary force from a motor 33, and may adjust the orientation of a thin film in the form of a sail in a desired direction.

FIG. 8 is an exemplary view of a highly detachable blade according to an aspect. In the wind power generation system according to an aspect of the present invention, an appropriate blade size for maximizing electricity generation efficiency may be a fairly large scale, and a wind direction may be different depending on the altitude. Accordingly, in order to maximize power in a target movement direction of the blade 30, even when a wind direction is different depending on the altitude, the blade has a first portion 37a, a second portion 37b, and a third portion 37c divided according to the attitude, and has a first joint 38a, a second joint 38b, and a third joint 38c. By configuring each joint portion to be rotatable, respectively, it is possible to set the orientation of a thin film in the form of a sail included in each portion differently. In other words, each of the plurality of blades 30 may have a first partial blade and a second partial blade divided in a height direction, the first partial blade and the second partial blade may be configured to be rotatable independently of each other, and the first partial blade and the second partial blade may be rotated to maximize power in the target movement direction of the blade 30 based on information on a wind direction at each arranged height.

The acquisition of position information for determining the target movement direction of the blade and information on a wind direction may be achieved by employing any of the conventional sensor systems, and the control system for determining and changing the orientation of the blade may also select any of the conventional control systems.

For example, the information on a position of each of the plurality of blades in the loop may be acquired by receiving a position identification signal from at least one of a position identification signal generation device provided in a plural number in the loop by a position signal reception device provided in each of the plurality of blades. In another aspect, position information of each blade may be determined by a positioning system such as GPS. The target movement direction according to the position of the blade may be determined according to table information stored in the database, or a computing device may be configured to calculate in real time based on each position and the loop shape. The information on a wind direction may be acquired from a wind direction sensor provided in each of the plurality of blades, and accurate information on a wind direction for each blade may be used. The control system for performing a calculation such as orientation determination may be set to be provided with a separate computing device or processor for each blade, or by having an integrated control system configured to transmit and receive information to and from each blade, the integrated control system may be configured to control each blade.

Referring back to FIG. 2, the wind power generation system 100 according to an embodiment of the present invention may have a plurality of nacelles. For example, the nacelle 40 may have a power generator having a power generator central shaft gear 45-1, and may also further have a separate nacelle including an additional power generator having a power generator central shaft gear 45-2.

Depending on the form of a wind power generator, the power generator provided in the nacelle 40 may be configured to have a predetermined target rotation speed. Alternatively, it may be required to adjust the target rotation speed as needed.

In the third embodiment, the plurality of moving bodies 2120 are each movable on the rail 2110, so that an interval between the moving bodies 2120 may be changed. FIG. 10 is a top view of a wind power generation system according to an aspect. FIG. 11 is a top view of a wind power generation system with an adjustable blade interval. In terms of adjusting the rotation speed of the power generator central rotary shaft, a form in which the moving speed of the blade is controlled is possible. As illustrated in FIG. 11, the rail may include a straight section 1110 and curved sections 1120-1 and 1120-2, and the plurality of blades may be configured to be arranged at narrower intervals when positioned in the curved sections 1120-1 and 1120-2 than when positioned in the straight section 1110.

In the wind power generation system according to an embodiment of the present invention, measures to protect the blades may be needed in a situation in which the normal operation of the wind power generation system is not guaranteed, such as the occurrence of a typhoon. In this regard, for example, a protective measure of the blade may be performed in a way that a housing unit for storage of the blades is installed, the fastening between the blades is made, or the blade is folded toward the ground.

FIG. 14 is an exemplary view of a housing unit built separately. As illustrated in FIG. 14, the wind power generation system according to an embodiment of the present invention may further include: a housing unit 1430 in which a plurality of blades are housed; a junction 1410 included in a rail; and a housing rail 1420 for providing a movement path from the junction to the housing unit, wherein the plurality of blades 30 may be configured to be housed in the housing unit 1430 via the junction 1410 and the housing rail 1420. As in the third embodiment, when the blades 2130 provided in each moving body 2120 are configured to be slidably movable on the rail 2110, the moving bodies 2120 having the blade 2130 may be moved as a measure from the junction 1410 on the rail 2110 to the housing rail 1420 when protective measures are needed, and may be slidably moved along the housing rail 1420 to be housed in the housing unit 1430 as a measure.

FIG. 15 is an exemplary view of a housing unit built on a rail. As illustrated in FIG. 15, the wind power generation system according to an embodiment of the present invention may further include a housing unit 1530 configured to pass through the rail 10, and the plurality of blades 30 may be configured to be housed in the housing unit 1530 by moving along the rail 10. Also in the embodiment illustrated by FIG. 15, as in FIG. 14, the blades 30 may be moved to the housing unit 1530 in various ways according to the coupling relationship of the moving body and/or the blade with the rail. In the third embodiment, the plurality of moving bodies 2120 may move along the rail 2120 to be housed in the housing unit.

FIG. 16 is an exemplary view of a fastening form between blades. As illustrated in FIG. 16, a plurality of blades of a blade 1630-1 to a blade 1630-2 may be coupled to each other when protective measures against typhoons are needed.

According to an aspect, each of the plurality of blades may include a fastening unit for coupling with an adjacent blade when an interval between the plurality of blades is minimized. In other words, as a result, the plurality of blades are all coupled through fastening between adjacent blades, thereby improving resistance to typhoons.

According to another aspect, the plurality of blades may include a first blade 1630-1 positioned on a leftmost side and a second blade 1630-2 positioned on a rightmost side when an interval between the plurality of blades is minimized, wherein the first blade 1630-1 and the second blade 1630-2 may each have a fastening unit, and the plurality of blades may be coupled by the fastening unit of the first blade and the fastening unit of the second blade that are fastened to each other. In addition, a configuration in which a plurality of blades are coupled through various embodiments is possible.

FIG. 17 is an exemplary view of a blade foldable in a ground direction. As illustrated in FIG. 17, each of the plurality of blades may be configured to be foldable toward a ground direction. The blades that are normally positioned in a normal position 1730 and generate power based on wind energy are folded to a ground adjacent position 1740 at a time when protective measures are needed, such as a risk of typhoon, to minimize the influence of the wind.

Fourth Embodiment

According to another embodiment of the present invention, a rail part in the form of a railway is configured, and a moving body capable of moving through the railway based on wind power is provided with at least one blade to move on the rail part. After the moving body generates power on its own, it is possible to implement a wind power generation system that may transmit the generated electricity through the railway.

Figure 23:
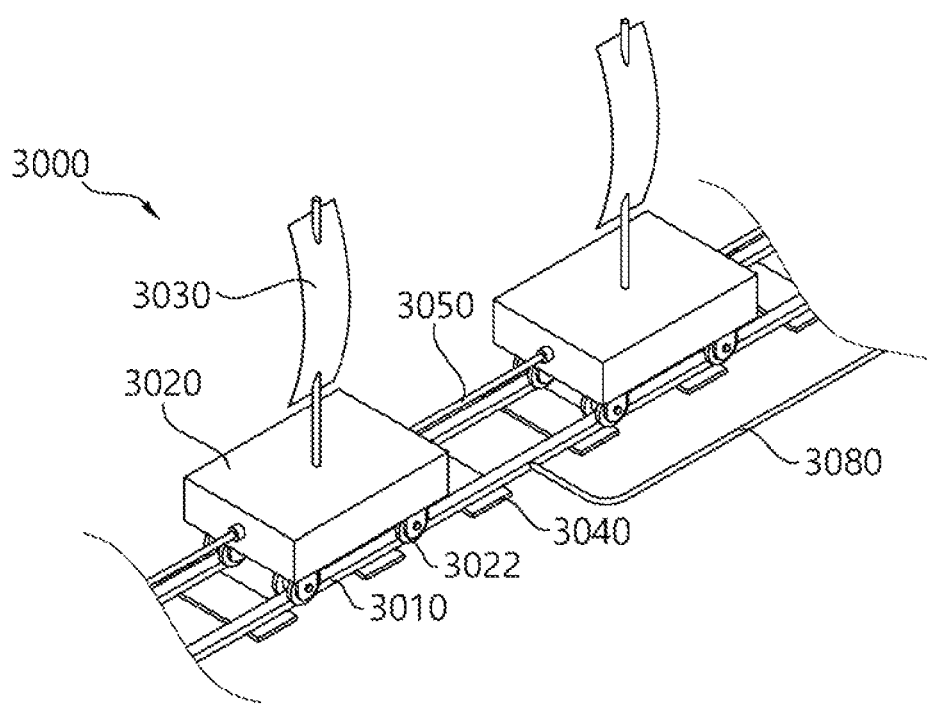
FIG. 23 is a conceptual view of a wind power generation system according to a fourth embodiment of the present invention.

FIG. 23 is a conceptual view of a wind power generation system according to a fourth embodiment of the present invention.

As illustrated in FIG. 23, a wind power generation system 3000 according to the fourth embodiment includes a rail part 3010 that provides a horizontal movement path and a plurality of moving bodies 3020 configured to move along the movement path of the rail part 3010.

The moving body 3020 may be provided with at least one blade 3030 that provides power for movement of the moving body 3020 based on wind energy. The embodiment illustrated in FIG. 23 illustrates an example in which one blade 3030 is provided per moving body 3030, but there may be a plurality of blades provided in the moving body 3020. For example, the blade provided on the moving body 3020 may be a highly separated blade as illustrated in FIG. 8, or may be provided with a plurality of highly separated blades.

The moving body 3020 receives kinetic energy based on wind-based power provided by the blade 3030. The moving body 3020 may be provided with a plurality of wheels 3022, which engage with the rail part 3010 and rotate based on the power provided by the blade 3030 so as to move the moving body along the movement path of the rail part 3010.

Figure 24:
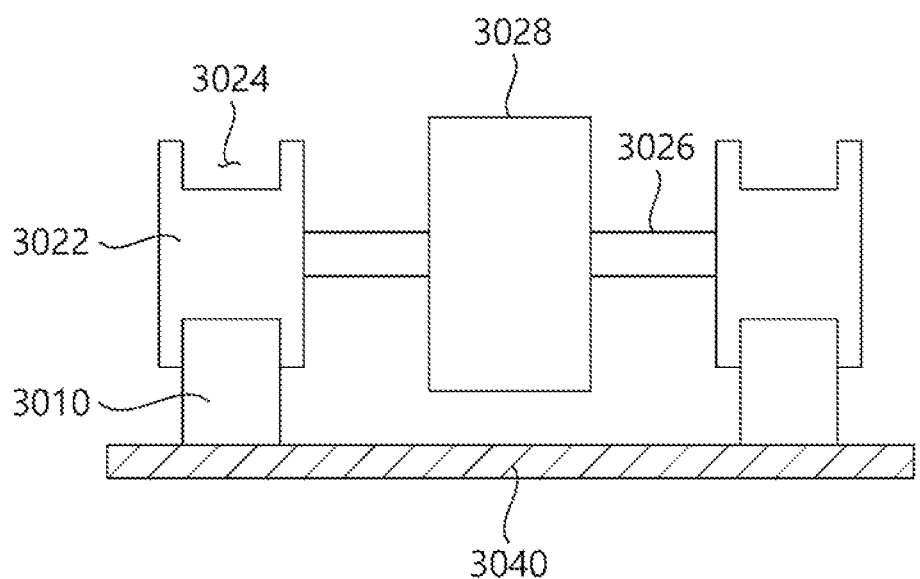
FIG. 24 is a cross-sectional view for explaining an engagement structure of the rail and the moving body illustrated in FIG. 23 and a connection structure between the same and the rotary shaft and nacelle.

FIG. 24 is a cross-sectional view for explaining an engagement structure of the rail part 3010 and the moving body 3020 illustrated in FIG. 23 and a connection structure between the same and the rotary shaft and nacelle.

As illustrated in FIG. 24, the rail part 3010 consists of two rails paired in parallel, and a support plate 3040 is installed at the bottom to secure the pair of rails. In other words, the rail part 3010 may be configured in the form of a railroad. Correspondingly, in order to move the moving body 3020, an engagement groove 3024 for inserting the rail of the rail part 3010 may be formed in the center of the outer peripheral surface of the wheel 3022 provided on the moving body 3020. Accordingly, the moving body 3020 may be configured in a form similar to the moving structure of a train and may move on the rail part 3010.

There may be a plurality of wheels provided on the moving body 3020. For example, in FIG. 24, an example having four wheels is described, but the number of wheels 3022 provided on the moving body 3020 may vary depending on the implementation environment. According to yet another embodiment of the present invention, the rail part may also be configured of one rail, such as a monorail, or may be configured of three or more rail pairs.

The interior of the moving body 3020 includes a nacelle 3028 having a power generator for producing electricity based on rotational force of the wheels 3022. The rotary shaft of the power generator provided in the nacelle 3028 is directly or indirectly connected to a rotary shaft 3026 of the wheels 3022, so that the power generator generates electricity based on the rotational force according to the rotation of the wheels 3022.

Figure 25:
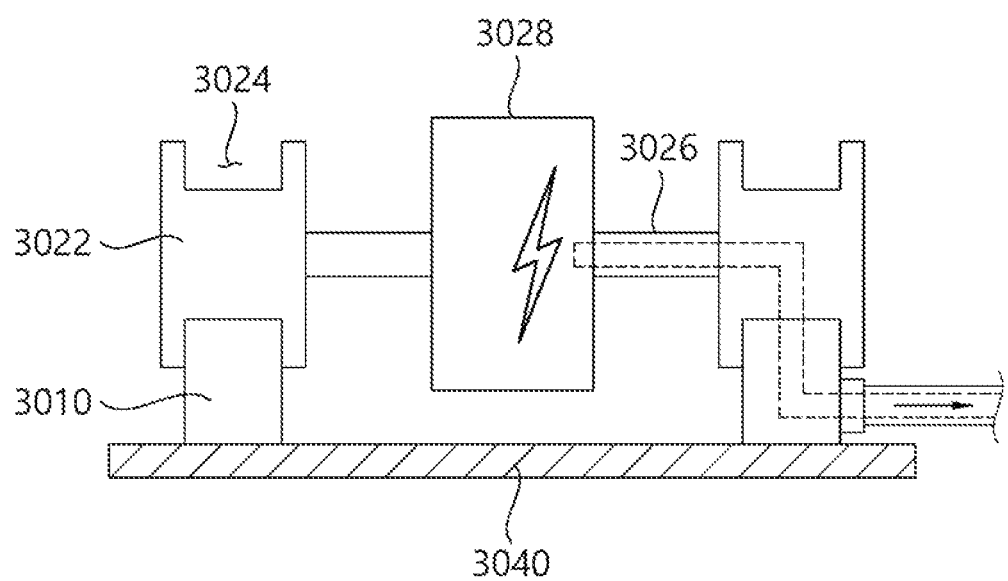
FIG. 25 is an exemplary view of a path through which electricity generated by the power generator in FIG. 24 is transmitted to a transmission line.

FIG. 25 is an exemplary view of a path through which electricity generated by the power generator in FIG. 24 is transmitted to a transmission line.

Referring to FIGS. 23 and 25, the power generator, the rotary shaft 3026 of the wheels, the wheels 3022, the rail part 3010, and a transmission line 3080 for transmitting electricity to the outside may be electrically connected, and as shown in the electricity transmission path illustrated in FIG. 25, electricity produced from a power generator within the nacelle 3028 and/or electricity produced by the power generator and stored in a capacitor within the nacelle 3028 may be transmitted to the transmission line 3080 through the rotary shaft 3026, the wheel 3022, and the rail part 3010. To this end, at least a portion of each of the rotary shaft 3026, the wheels 3022, and the rail part 3010 may be made of a conductor that facilitates electrical transmission.

In other words, according to the fourth preferred embodiment of the present invention, the moving body 3020 for moving based on wind power on the rail part 3010 in the form of a railway may generate power on its own using the rotational force of the wheels 3022, and may implement a wind power generation system that may transmit the generated electricity to the outside using the rail part 3010 without installing a separate transmission member.

Figure 26:
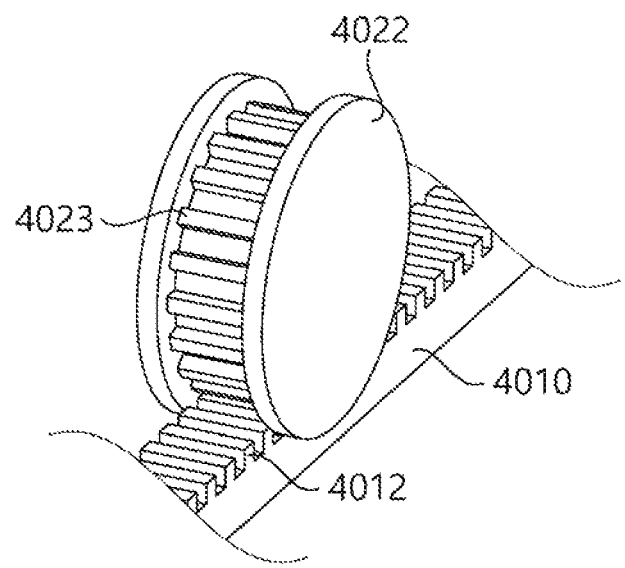
FIG. 26 is a conceptual view for explaining a structure that prevents slipping by configuring the interval between wheels and rails in the shape of a toothed wheel.

FIG. 26 is a conceptual view for explaining a structure that prevents slipping and facilitates control by configuring the interval between wheels and rails in the shape of a toothed wheel.

As illustrated in FIG. 26, a plurality of first gear ridges 4012 are formed on the wheel contact surface, for example, the upper surface, of the rail part 4010. Correspondingly, a plurality of second gear ridges 4023 that may engage with the gear ridges 4012 of the rail part 4010 are formed along the contact surface of the rail part of wheels 4022 of the moving body, for example, the outer peripheral surface of a rail part engagement groove.

In this connection, unnecessary slipping of the moving body may be prevented, and braking of the moving body becomes easier in an emergency situation. Accordingly, precise and accurate control of the movement of the moving body becomes possible. The shape of the gear ridge may be of various shapes, including polygons such as squares and triangles, as well as semicircular and wavy shapes, based on the cross section.

Figure 27:
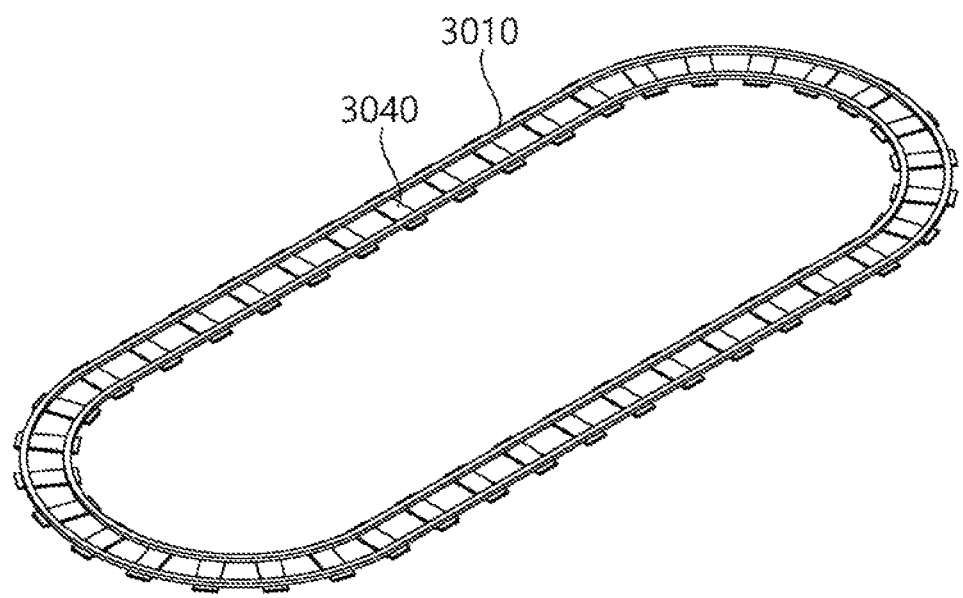
FIG. 27 is a perspective view for explaining a rail part forming a loop.

FIG. 27 is a perspective view for explaining a rail part forming a loop. In the same sense as in the first to third embodiments described above, the rail part 3010 may form a loop.

Figure 28:
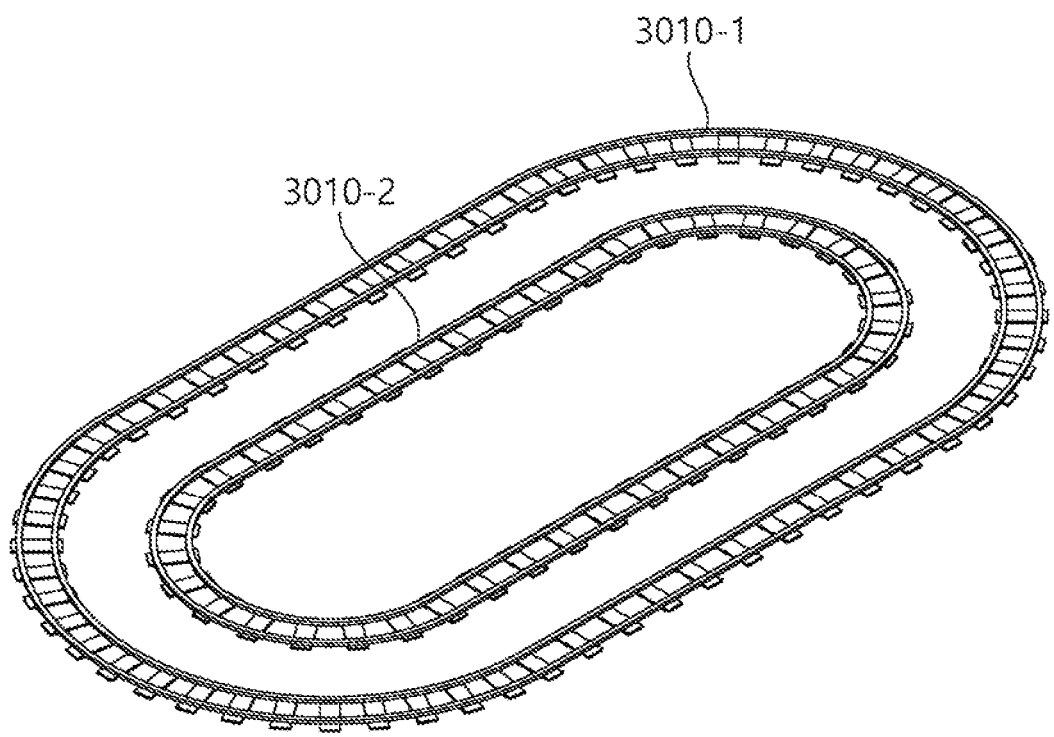
FIG. 28 is a perspective view for explaining a plurality of rail parts forming a plurality of loops.

In addition, according to another embodiment of the present invention, the wind power generation system may be provided with a plurality of rail parts to form a plurality of loops. FIG. 28 is a perspective view for explaining a plurality of rail parts forming a plurality of loops. As illustrated in FIG. 28, the plurality of rail parts may include a first rail part 3010-1 forming a first loop, and a second rail part 3010-2 forming a relatively small second loop disposed inside the first loop 3010-1.

For a similar purpose, the features of the present invention described below with reference to the third embodiment and related drawings may also be applied to the fourth embodiment. In the following description, it will be described together with the reference numerals of the rail and the moving body of the first embodiment, but those skilled in the art will be able to easily apply to the fourth embodiment according to the description.

For example, referring to FIGS. 1 and 2, in the wind power generation system according to an embodiment of the present invention, the rail 10 may be configured to form a loop. For the same purpose, the rail part 3010 in the fourth embodiment may be configured to form a loop, as illustrated in FIGS. 27 and 28. According to an aspect, in the fourth embodiment, the wind power generation system may further include an upper frame supported by a plurality of upper frame supports, wherein the upper frame may be configured to maintain the blades 3030 provided in the moving body 3020 movably to improve the standing stability of the blades 3030.

Since the rails 10 and 3010 are formed as a loop, the movement path of the plurality of blades and/or the moving body may have a circulating structure. Herein, each of the plurality of blades 3030 may be configured to adaptively rotate to maximize power in a target movement direction based on information on a wind direction and information on the target movement direction determined according to a position of each of the plurality of blades 3030 in the loop.

According to another aspect, each of the plurality of blades 3030 may be configured of a flexible material and have a plurality of air pockets, and may also be configured to be deformed into a shape that maximizes power in a target movement direction by controlling an air filling amount for at least one air pocket among the plurality of air pockets based on information on a wind direction and information on the target movement direction determined according to a position of each of the plurality of blades in the loop.

The target movement direction will be described in more detail with reference to FIG. 10. FIG. 10 is a top view of a wind power generation system according to an aspect. As illustrated in FIG. 10, according to an embodiment of the present invention, the loop formed by the rail 10 (corresponding to the rail part 3010 in the fourth embodiment) may include, for example: a first portion 1010 for providing a movement path in a first direction; a second portion 1030 for providing a movement path in a second direction opposite to the first direction; a first joint portion 1020 for providing a movement path from the first portion to the second portion; and a second joint portion 1040 for providing a movement path from the second portion to the first portion. For example, the blades may be configured to move clockwise within the loop. Accordingly, the target movement direction of the blades in the first portion 1010 may be a (right→left) direction in FIG. 10, and the target movement direction of the blades in the first joint portion 1020 is gradually changed from a (right→left) direction to a (downward→upward) direction, and again in a (left→right) direction, depending on the extent to which the blades have moved from the first portion 1010 to the second portion 1030. The target movement direction of the blades in the second portion 1030 is determined in a (left→right) direction, and the target movement direction of the blades in the second joint portion 1040 is gradually changed from a (left→right) direction to a (upward→downward) direction, and again in a (right→left) direction, depending on the extent to which the blades have moved from the second portion 1030 to the first portion 1010. In other words, the target movement direction of the blades may be determined differently according to a position of each blade in the loop.

When the target movement direction of each blade is determined, based on the information on a wind direction, each blade may be configured to adaptively rotate so that the orientation of each blade is changed to maximize the power in the target movement direction of each blade. For example, rotation of each of the plurality of blades may be performed based on a rotary shaft perpendicular to the ground.

For example, each of the plurality of blades may be configured to rotate in a direction to perform leeward sailing, in response to a determination that the target movement direction coincides with a wind direction, and each of the plurality of blades may be configured to rotate in a direction to perform windward sailing, in response to a determination that the target movement direction is opposite to the wind direction. In FIG. 10, when the wind direction is a (right→left) direction, the blade may be rotated in the direction to perform the leeward sailing in the first portion 1010, and the blade may be rotated in the direction to perform the windward sailing in the second portion 1030. In the first joint portion 1020 and the second joint portion 1030, the blade may be rotated to maximize power according to the target movement direction according to the positions of the respective blades.

According to an aspect of the present invention, each blade may be configured in a form such as a sail of a sailing yacht. Each blade may be provided with a support, and a thin film in the form of a sail may be configured to be held by the support. Accordingly, it is possible to configure the wind power generation system according to an aspect of the present invention at a significantly reduced facility cost compared to a conventional wind power generator having a large rotor blade. The thin film in the form of a sail may be formed of a tent material such as hemp cloth or cotton cloth, or a synthetic fiber such as tetron, or a polymer fusion material may also be used.

As described above, with respect to the principle of Bernoulli's theorem and/or the adjustment principle of the heading direction of a sailing yacht, it is possible to deform each of the blades 3030 to have a shape that maximizes power in a target movement direction. For example, according to Bernoulli's theorem, by varying the airflow velocity on either side of the blade by increasing the gradient on one side of the blade and making it larger relative to the gradient on the other side, it may be configured to generate power from one specific side of the blade to the opposite side.

In an exemplary embodiment, each of the plurality of blades may be made of a flexible material and have a plurality of air pockets, and may be configured to selectively change an air filling amount in a specific air pocket among the plurality of air pockets. Accordingly, it is possible to implement a shape in which the blade has power in a desired direction under a predetermined wind condition. An air pump may be used, for example, to change the air filling amount.

In another embodiment, a blade in the form of a thin film that does not have a separate air pocket may be controlled by a support in the form of a grid that may change an angle in units of segments, and it may also be configured to deform the blade into a shape that maximizes power in a desired movement direction under a given wind condition by changing an amount of rotation in units of each grid cell.

According to an aspect of the present invention, the rotation of each blade may be, for example, performed based on a rotary shaft perpendicular to the ground. FIG. 7 is a cross-sectional view of a blade support according to an aspect. As illustrated in FIG. 7, the support of each blade may include an upper support 31 configured to support a thin film in the form of a sail and a lower support 32 to which the upper support 31 is rotatably coupled. The lower support 32 provides a cavity through which a blade rotary shaft 35 coupled to the upper support 31 may pass. The blade rotary shaft 35 may be connected to a motor shaft 34 to rotate the upper support by rotation based on the rotary force from a motor 33, and may adjust the orientation of a thin film in the form of a sail in a desired direction.

FIG. 8 is an exemplary view of a highly detachable blade according to an aspect. In the wind power generation system according to an aspect of the present invention, an appropriate blade size for maximizing electricity generation efficiency may be a fairly large scale, and a wind direction may be different depending on the altitude. Accordingly, in order to maximize power in a target movement direction of the blade 30, even when a wind direction is different depending on the altitude, the blade has a first portion 37a, a second portion 37b, and a third portion 37c divided according to the attitude, and has a first joint 38a, a second joint 38b, and a third joint 38c. By configuring each joint portion to be rotatable, respectively, it is possible to set the orientation of a thin film in the form of a sail included in each portion differently. In other words, each of the plurality of blades 30 may have a first partial blade and a second partial blade divided in a height direction, the first partial blade and the second partial blade may be configured to be rotatable independently of each other, and the first partial blade and the second partial blade may be rotated to maximize power in the target movement direction of the blade 30 based on information on a wind direction at each arranged height.

The acquisition of position information for determining the target movement direction of the blade and information on a wind direction may be achieved by employing any of the conventional sensor systems, and the control system for determining and changing the orientation of the blade may also select any of the conventional control systems.

For example, the information on a position of each of the plurality of blades in the loop may be acquired by receiving a position identification signal from at least one of a position identification signal generation device provided in a plural number in the loop by a position signal reception device provided in each of the plurality of blades. In another aspect, position information of each blade may be determined by a positioning system such as GPS. The target movement direction according to the position of the blade may be determined according to table information stored in the database, or a computing device may be configured to calculate in real time based on each position and the loop shape. The information on a wind direction may be acquired from a wind direction sensor provided in each of the plurality of blades, and accurate information on a wind direction for each blade may be used. The control system for performing a calculation such as orientation determination may be set to be provided with a separate computing device or processor for each blade, or by having an integrated control system configured to transmit and receive information to and from each blade, the integrated control system may be configured to control each blade.

Depending on the form of a wind power generator, the power generator provided in the nacelle may be configured to have a predetermined target rotation speed. Alternatively, it may be required to adjust the target rotation speed as needed.

In the fourth embodiment, the plurality of moving bodies 3020 are each movable on the rail part 3010, so that an interval between the moving bodies 3020 may be changed. For example, a connection part 3050 that connects the moving bodies 3020 may be configured to variably adjust an interval between the moving bodies. FIG. 10 is a top view of a wind power generation system according to an aspect. FIG. 11 is a top view of a wind power generation system with an adjustable blade interval. In terms of adjusting the rotation speed of the power generator central rotary shaft, a form in which the moving speed of the blade is controlled is possible. As illustrated in FIG. 11, the rail may include a straight section 1110 and curved sections 1120-1 and 1120-2, and the plurality of blades may be configured to be arranged at narrower intervals when positioned in the curved sections 1120-1 and 1120-2 than when positioned in the straight section 1110.

In the wind power generation system according to an embodiment of the present invention, measures to protect the blades may be needed in a situation in which the normal operation of the wind power generation system is not guaranteed, such as the occurrence of a typhoon. In this regard, for example, a protective measure of the blade may be performed in a way that a housing unit for storage of the blades is installed, the fastening between the blades is made, or the blade is folded toward the ground.

FIG. 14 is an exemplary view of a housing unit built separately. As illustrated in FIG. 14, the wind power generation system according to an embodiment of the present invention may further include: a housing unit 1430 in which a plurality of blades are housed; a junction 1410 included in a rail; and a housing rail 1420 for providing a movement path from the junction to the housing unit, wherein the plurality of blades 30 may be configured to be housed in the housing unit 1430 via the junction 1410 and the housing rail 1420. As in the third embodiment, when the blades 2130 provided in each moving body 2120 are configured to be slidably movable on the rail 2110, the moving bodies 2120 having the blade 2130 may be moved as a measure from the junction 1410 on the rail 2110 to the housing rail 1420 when protective measures are needed, and may be slidably moved along the housing rail 1420 to be housed in the housing unit 1430 as a measure. As in the fourth embodiment, when each moving body 3020 having the blades 3030 is configured to be movable on the rail 3010 with a movement principle similar to that of a train, the moving bodies 3020 may be moved as a measure from the junction on the rail 3010 to the housing rail when protective measures are needed, and may be moved along the housing rail to be housed in the housing unit as a measure.

FIG. 15 is an exemplary view of a housing unit built on a rail. As illustrated in FIG. 15, the wind power generation system according to an embodiment of the present invention may further include a housing unit 1530 configured to pass through the rail 10, and the plurality of blades 30 may be configured to be housed in the housing unit 1530 by moving along the rail 10. Also in the embodiment illustrated by FIG. 15, as in FIG. 14, the blades 30 may be moved to the housing unit 1530 in various ways according to the coupling relationship of the moving body and/or the blade with the rail. In the fourth embodiment, the plurality of moving bodies 3020 may move along the rail 3010 to be housed in the housing unit.

FIG. 17 is an exemplary view of a blade foldable in a ground direction. As illustrated in FIG. 17, each of the plurality of blades may be configured to be foldable toward a ground direction. The blades that are normally positioned in a normal position 1730 and generate power based on wind energy are folded to a ground adjacent position 1740 at a time when protective measures are needed, such as a risk of typhoon, to minimize the influence of the wind. This foldable blade is applicable to any of the first to fourth embodiments.

Figure 29:
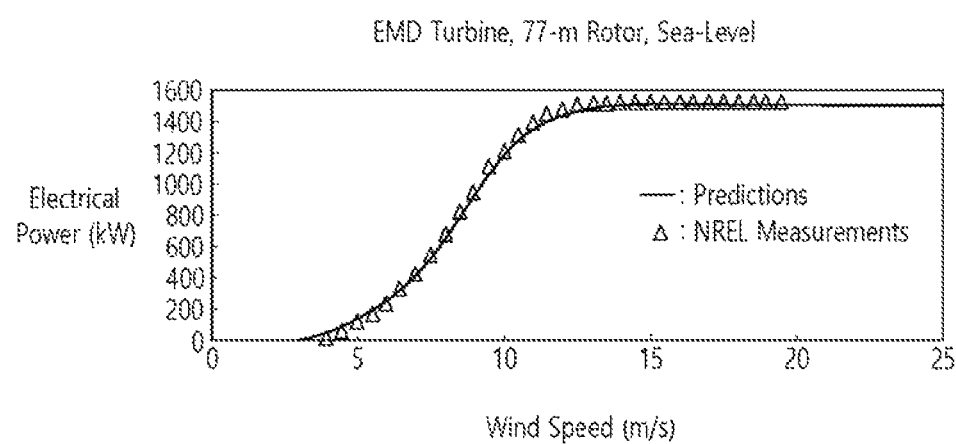
FIG. 29 shows the results of comparing the output of a conventional wind power generator and a wind power generation system according to an embodiment of the present invention.

FIG. 29 shows the results of comparing the output of a conventional wind power generator and a wind power generation system according to an embodiment of the present invention. In FIG. 29, the predicted power output is illustrated compared to a conventional wind power generator (NREL's EMD turbine installed in California, USA (rotor diameter 77 m)). In this regard, it may be understood that an individual turbine subjected to the tailwind, where the maximum output is generated, shows similar or higher output compared to a general-purpose wind turbine. Moreover, it was found that the pressure loss related to the generation of noise was as small as $\frac{1}{65}$ of a conventional general-purpose turbine (260 Pa, based on the maximum pressure loss) (Reference: Li et al., 2020, Renewable Energy).

As a result of the fluid dynamics analysis, in the case of an individual sail-shaped turbine and in the case of a wind direction close to the tailwind, an output similar to or superior to that of a conventional general-purpose wind turbine could be expected, but from the turbine's point of view along the rail, when the wind direction deviates from the tailwind and is changed to the wind direction of the headwind trend, there is a sharp decrease in output, and overall output is evaluated to be lower than that of the existing wind farm with the same installed capacity. However, when the maximum power is received through the rotation of the blade adaptively according to the direction of the wind according to an aspect of the present invention, it is expected that the output reduction issue will be solved.

In addition, the wind power system according to an embodiment of the present invention has fewer driving units compared to a conventional wind turbine, and has a simple structure, so that when a larger-scale turbine is used, additional output improvement can be expected. Moreover, the pressure loss directly related to the noise of wind power generation is $1/65$ (based on the maximum pressure loss) compared to a conventional wind turbine of the same scale, indicating that it has the strength of low-noise driving.

Hereinbefore, the embodiments of the present invention have been described with reference to the accompanying drawing, but the scope of protection of the present invention should not be construed as being limited to the drawings or embodiments. It will be understood by those skilled in the technical field that the present invention allows various modifications and variations without departing from the scope and spirit of the present invention as described in the claims below.

The above-described present invention has been described based on a series of functional blocks, but it is not limited by the above-described embodiment and attached drawings, and it is obvious to those skilled in the technical field to which the present invention pertains that embodiments may be substituted, modified, and changed in various ways within the scope of the technical ideas of the present invention.

The combination of the above-described embodiments is not limited to the above-described embodiments, and various forms of combinations as well as the above-described embodiments may be provided according to implementation and/or need.

The above-described embodiments include various forms of examples. It is not possible to describe all possible combinations for indicating various forms, but those skilled in the technical field would easily recognize the possibility of other combinations. Accordingly, it should be understood that the present invention includes all other substitutions, modifications, and changes within the scope of claims below.

What is claimed is:

1. A wind power generation system, comprising:
   a rail part for providing a horizontal movement path, the rail part having a railway shape in which two rails are paired in parallel and are separated from each other horizontally, the two rails arranged on a plane in parallel to a ground surface; and
   a plurality of moving bodies for moving along the movement path of the rail part, each of the plurality of moving bodies comprising:
   a bottom side facing the ground surface;
   a top side opposite to the bottom side, the top side provided with a vertically arranged mast erected perpendicularly to the ground surface;
   at least one blade installed on the mast and configured to provide power for moving the moving body based on energy generated by wind;
   a plurality of wheels fixed to the bottom side to engage with the rail part, the plurality of wheels configured to rotate based on the power provided by the at least one blade so as to move a corresponding one of the plurality of moving bodies along the movement path of the rail part; and
   a nacelle having a power generator for producing electricity based on rotational force of the wheels plurality of wheels; and
   each of the at least one blade includes a first partial blade and a second partial blade,
   the first partial blade and the second partial blade are separated from each other in a height direction and are configured to be rotatable independently of each other, and
   the first partial blade and the second partial blade are configured to adaptively rotate to maximize the power for moving the plurality of moving bodies.

2. The wind power generation system of claim 1, wherein the rail part includes a support plate for supporting the two rails, the support plate being disposed between the bottom side and the ground surface and having opposite ends to secure the two rails, respectively,
   each of the plurality of wheels comprises an engagement groove into which one of the two rails is inserted, and
   each of the plurality of moving bodies has mass providing gravitational force for seating the rail part in the engagement groove, such that an electrical path between the rail part and a corresponding one of the plurality of wheels is secured.

3. The wind power generation system of claim 2, further comprising:
   a rotary shaft for driving at least one of the plurality of wheels; and
   a transmission line for transmitting electricity to an outside, the transmission line electrically connected to at least one of the two rails,
   wherein:
      the nacelle includes a capacitor for storing electricity produced by the power generator,
      the power generator is connected to the rotary shaft and produces electricity based on the rotational force transmitted from the rotary shaft, and
      the power generator, the rotary shaft, the at least one of the plurality of wheels, the rail part, and the transmission line are electrically connected so that electricity stored in the capacitor is transmitted to the transmission line through the rotary shaft, the at least one of the plurality of wheels, and the rail part.

4. The wind power generation system of claim 3, wherein the electrical connection of the power generator, the rotary shaft, the at least one of the plurality of wheels, the rail part, and the transmission line is configured so that the electricity transmitted to the transmission line includes the electricity produced from the power generator and the electricity stored in the capacitor.

5. The wind power generation system of claim 2, further comprising:
   a rotary shaft for driving at least one of the plurality of wheels; and
   a transmission line for transmitting electricity to an outside, the transmission line electrically connected to at least one of the two rails,
   wherein:
      the power generator is connected to the rotary shaft and produces electricity based on the rotational force transmitted from the rotary shaft, and
      the power generator, the rotary shaft, the at least one of the plurality of wheels, the rail part, and the transmission line are electrically connected so that electricity produced from the power generator is transmitted to the transmission line through the rotary shaft, the at least one of the plurality of wheels, and the rail part.

6. The wind power generation system of claim 1, wherein information on a wind direction is acquired from a wind direction sensor provided in each of the at least one blade.

7. The wind power generation system of claim 1, wherein each of the at least one blade has a horizontal length of 90 m and a vertical height of 120 m.

8. The wind power generation system of claim 1, wherein each of the at least one blade is configured to adaptively rotate so that a moving speed of each of the plurality of moving bodies approaches 1.9 m/s.

9. A moving body used in a wind power generation system, the moving body being configured to move along a movement path of a rail part for providing a horizontal movement path, the rail part having a railway shape in which two rails are paired in parallel and are separated from each other horizontally, the two rails arranged on a plane in parallel to a ground surface, the moving body comprising:
a bottom side facing the ground surface;
a top side opposite to the bottom side, the top side provided with a vertically arranged mast erected perpendicularly to the ground surface;
at least one blade installed on the mast and configured to provide power for moving the moving body based on energy generated by wind;
a plurality of wheels fixed to the bottom side to engage with the rail part, the plurality of wheels configured to rotate based on the power provided by the at least one blade so as to move the moving body along the movement path of the rail part; and
a nacelle having a power generator for producing electricity based on rotational force of the plurality of wheels; and
each of the at least one blade includes a first partial blade and a second partial blade,
the first partial blade and the second partial blade are separated from each other in a height direction and are configured to be rotatable independently of each other, and
the first partial blade and the second partial blade are configured to adaptively rotate to maximize the power for moving the moving body.

10. The moving body of claim 9, wherein
the rail part includes a support plate for supporting the two rails, the support plate being disposed between the bottom side and the ground surface and having opposite ends to secure the two rails, respectively,
each of the plurality of wheels comprises an engagement groove into which one of the two rails is inserted, and
the moving body has mass providing gravitational force for seating the rail part in the engagement groove, such that an electrical path between the rail part and a corresponding one of the plurality of wheels is secured.

11. The moving body of claim 10, further comprising:
a rotary shaft for driving at least one of the plurality of wheels; and
a transmission line for transmitting electricity to an outside, the transmission line electrically connected to at least one of the two rails,
wherein:
the power generator is connected to the rotary shaft and produces electricity based on the rotational force transmitted from the rotary shaft, and
the power generator, the rotary shaft, the at least one of the plurality of wheels, the rail part, and the transmission line are electrically connected so that electricity produced from the power generator is transmitted to the transmission line through the rotary shaft, the at least one of the plurality of wheels, and the rail part.

12. The moving body of claim 9, further comprising:
a rotary shaft for driving at least one of the plurality of wheels; and
a transmission line for transmitting electricity to an outside, the transmission line electrically connected to at least one of the two rails,
wherein:
the nacelle includes a capacitor for storing electricity produced by the power generator,
the power generator is connected to the rotary shaft and produces electricity based on the rotational force transmitted from the rotary shaft, and
the power generator, the rotary shaft, the at least one of the plurality of wheels, the rail part, and the transmission line are electrically connected so that electricity stored in the capacitor is transmitted to the transmission line through the rotary shaft, the at least one of the plurality of wheels, and the rail part.

13. The moving body of claim 12, wherein the electrical connection of the power generator, the rotary shaft, the at least one of the plurality of wheels, the rail part, and the transmission line is configured so that the electricity transmitted to the transmission line includes the electricity produced from the power generator and the electricity stored in the capacitor.

14. A system for generating wind power, the system comprising:
a rail part for providing a horizontal movement path; and
a plurality of moving bodies for moving along the movement path of the rail part, each of the plurality of moving bodies comprising:
a bottom side facing a ground surface;
a top side opposite to the bottom side, the top side provided with a vertically arranged mast erected perpendicularly to the ground surface;
a blade installed on the mast and configured to provide power for moving the moving body based on energy generated by wind;
at least one wheel fixed to the bottom side to engage with the rail part, the at least one wheel configured to rotate based on the power provided by the blade so as to move a corresponding one of the plurality of moving bodies along the movement path of the rail part; and
a nacelle having a power generator for producing electricity based on rotational force of the at least one wheel,
wherein
the rail part includes a support plate for supporting the rail part, the support plate being disposed between the bottom side and the ground surface,
each of the at least one wheel comprises an engagement groove into which a rail of the rail part is inserted, and
each of the plurality of moving bodies has mass providing gravitational force for seating the rail part in the engagement groove, such that an electrical path between the rail part and a corresponding one of the at least one wheel is secured; and
each of the blade includes a first partial blade and a second partial blade, the first partial blade and the second partial blade are separated from each other in a height direction and are configured to be rotatable independently of each other, and the first partial blade and the second partial blade are configured to adaptively rotate to maximize the power for moving the moving body.

15. The system of claim 14, further comprising:

a rotary shaft for driving the at least one wheel; and a transmission line for transmitting electricity to an outside, the transmission line electrically connected to the rail part, wherein:
- the power generator is connected to the rotary shaft and produces electricity based on the rotational force transmitted from the rotary shaft, and
- the power generator, the rotary shaft, the at least one wheel, the rail part, and the transmission line are electrically connected so that electricity produced from the power generator is transmitted to the transmission line through the rotary shaft, the at least one wheel, and the rail part.

16. The system of claim 14, further comprising:

a rotary shaft for driving the at least one wheel; and a transmission line for transmitting electricity to an outside, the transmission line electrically connected to the rail part, wherein:
- the nacelle includes a capacitor for storing electricity produced by the power generator,
- the power generator is connected to the rotary shaft and produces electricity based on the rotational force transmitted from the rotary shaft, and
- the power generator, the rotary shaft, the at least one wheel, the rail part, and the transmission line are electrically connected so that electricity stored in the capacitor is transmitted to the transmission line through the rotary shaft, the at least one wheel, and the rail part.

17. The system of claim 16, wherein the electrical connection of the power generator, the rotary shaft, the at least one wheel, the rail part, and the transmission line is configured so that the electricity transmitted to the transmission line includes the electricity produced from the power generator and the electricity stored in the capacitor.

18. The system of claim 14, wherein the rail part has a railway shape in which two rails are paired in parallel and are separated from each other horizontally, the two rails arranged on a plane in parallel to the ground surface, the support plate has opposite ends respectively configured to support and secure the two rails.

* * * * *